United States Patent
Harris

(12) United States Patent (10) Patent No.: US 6,502,669 B1
(45) Date of Patent: Jan. 7, 2003

(54) SECURITY DEVICE AND METHOD FOR TRANSPORT DEVICES

(76) Inventor: Charles D. Harris, 6927 Tumble La., Loomis, CA (US) 95650

( * ) Notice: Subject to any disclaimer, the term of this patent is extended or adjusted under 35 U.S.C. 154(b) by 0 days.

(21) Appl. No.: 09/784,951

(22) Filed: Feb. 15, 2001

(51) Int. Cl.[7] .............................................. B60B 33/00
(52) U.S. Cl. .................. 188/1.12; 188/19; 280/33.994; 16/35 R
(58) Field of Search ........................... 188/1.12, 17, 19, 188/20, 23, 31, 60; 280/33.994, 33.991, 33.992; 16/18 R, 35 R

(56) References Cited

U.S. PATENT DOCUMENTS

| | | |
|---|---|---|
| 3,002,370 A | 10/1961 | La Brie |
| 3,394,945 A | 7/1968 | Steier et al. |
| 3,475,036 A | 10/1969 | Smith |
| 3,590,962 A | 7/1971 | Parker et al. |
| 3,652,103 A | 3/1972 | Higgs |
| 3,873,902 A | 3/1975 | Burch |
| 3,892,295 A | 7/1975 | Hahto |
| 4,327,819 A | 5/1982 | Coutta |
| 4,524,985 A | 6/1985 | Drake |
| 4,577,880 A | 3/1986 | Bianco |
| 4,591,175 A * | 5/1986 | Upton et al. ................. 16/35 R |
| 4,629,950 A | 12/1986 | Ching |
| 4,772,880 A | 9/1988 | Goldstein et al. |
| 4,868,544 A | 9/1989 | Havens |
| 5,194,844 A | 3/1993 | Zelda |
| 5,432,412 A | 7/1995 | Harris et al. |
| 5,576,691 A | 11/1996 | Coakley et al. |
| 5,799,366 A | 9/1998 | Zocco et al. |
| 5,806,862 A | 9/1998 | Merryman et al. |
| 5,823,302 A | 10/1998 | Schweninger |
| 5,881,846 A | 3/1999 | French et al. |
| 6,054,923 A * | 4/2000 | Prather et al. ............. 188/1.12 |
| 6,102,414 A * | 8/2000 | Schweninger ................ 188/19 |
| 6,149,169 A | 11/2000 | Chelgren |
| 6,161,849 A * | 12/2000 | Schweninger ............... 16/18 R |
| 6,170,855 B1 | 1/2001 | Bianchetto |

* cited by examiner

*Primary Examiner*—Pam Rodriguez
(74) *Attorney, Agent, or Firm*—Theodore J. Bielen, Jr.

(57) ABSTRACT

A security device attachable to a transport device, such as a shopping cart, which includes a housing, an extension having a plurality of openings, and a swivel caster having a wheel all mounted to the cart in place of a preexisting swivel caster. A locking member is provided which is selectively moveable to reside in one of the plurality of openings of the extension for inhibiting movement of the swivel caster about a vertical pivot axis and fixing the swivel caster at an acute angle relative to the normal forward or reverse direction of travel of the transport device while allowing free wheel rotation about an axle. The security device further including an anti-tip member rigidly coupled to a back of the transport device for precluding tipping in order to redistribute the weight of the transport device onto its rear wheels in an attempt to circumvent the security device.

14 Claims, 15 Drawing Sheets

SECURITY DEVICE AND METHOD FOR TRANSPORT DEVICES

FIELD OF THE INVENTION

The present invention relates generally to a security device and method which restricts motion of a transport device, and in particular to a security device and method that controllably restricts the vertical, axial rotation or pivoting of a swivel caster about a vertical pivot axis correlative to, inter alia, a user defined range of motion for restricting the path of the transport device to which the security device is attached, thereby securing the transport device such as a shopping cart, stroller or the like, in a restricted area.

BACKGROUND OF THE INVENTION

Prior art devices for restricting the rotation of wheels attached to transport devices, such as carts, are known. These devices are especially well known in the retail industry where cart theft by customers and vagrants is prevalent and cart replacement by the retailer is costly. In this environment, it has been found that the prior art devices are plagued by a variety of problems. Foremost, the very nature of prior art devices mechanically locking up wheel rotation has been found to result in the destruction of the devices themselves and in the destruction of the associated wheels as a consequence of the cart being continually pushed or pulled long after the occurrence of mechanically locking up wheel rotation. Extreme occurrences of this type of destruction has been found to be prevalent with carts that have been collected after being wrongfully removed from a retailer's premise and continually pushed or pulled long after the occurrence of mechanically locking up wheel rotation. The collection of carts, often in a train like structures, from the premise itself is also problematic in that some carts are continually pushed long after the occurrence of mechanically locking up wheel rotation thereby causing damage and ultimate destruction to the prior art devices and wheels.

Ultimately, customer service satisfaction suffers as a result of the customer having to deal with the laborious, time consuming, and costly maintenance associated with known prior art devices.

Additionally, known prior art devices have been known to abruptly lock up wheel rotation and thus, violently lock up the cart under normal customer use. This places the customer pushing the cart, a person in the cart and bystanders in harms way. And, at the very least, it has been found that customers abandon carts that abruptly locked up wheel rotation under normal customer use and walk out the retailer's store thereby resulting in a lose of sales ultimately damaging the reputation of not only of the known prior art devices but the retailer's reputation as well.

Moreover, the known prior art devices generally mechanically complicated and are prone to failure under the predations of certain weather conditions, such as snow slush, freezing and the like.

Thus, in general, know prior art devices do not provide systems which take into account, inter alia, wear on the device parts and the associated wheels, mechanical simplicity, and device failure in certain weather conditions such as snow, slush, freezing and the like.

For example, the patent to French, et al, teaches a security device for a shopping cart that includes a braking member rotatably mounted on a wheel axle of one of the wheels. The braking member is movable between a raised position spaced above the ground surface and an operative position contacting the ground surface, and has a portion projecting radially outwardly from the outer peripheral rim of the wheel at least in the operative position so as to lift the wheel from the ground and impede rotation of the wheel. A locking device releasably locks the braking member or shell in the raised position, and is released by a trigger device in response to a signal from a signal system extending around an area in which carts are to be retained, at which point the braking member rotates into the operative position. The device is activated by a buried perimeter loop antenna system which extends around a predesignated area in which the carts are to be retained, and is connected to a signal generator.

Hence, the device of French, et al, is, inter alia, mechanically complicated and is prone to failure under the predations of certain weather conditions, such as snow, slush, freezing and the like wherein, for example, the braking shell can freeze into a lock position or become jammed by snow and slush clogging the braking shell thereby preventing it from moving from a raised to a lowered position. Moreover, the buried perimeter loop antenna is expensive to install, requires that the perimeter of the predesignated area (i.e., the perimeters of a retail establishment's parking lot) be torn open so the loop antenna can be installed and is easily defeated by the consumer by simply "snipping" or "cutting" the loop antenna thereby deactivating the system.

The patent to Schweninger teaches a toggle brake assembly which can be automatically actuated by an audio frequency signal when a shopping cart is taken out of a designated area. When actuated, as the wheel rotates in either direction, the toggle wedges or hooks to brake the wheel. To unlock the brake, a special reset key must be inserted into the brake assembly and turned.

Hence, the assembly of Schweninger is, inter alia, prone to both wear on the assembly parts and the associated wheel and is also prone to failure under the predations of certain weather conditions, such as snow, slush, freezing and the like wherein, for example, the braking wedges can freeze into a lock position or become jammed by snow and slush thereby preventing the toggle wedges or hooks from braking the wheel.

The patent to Harris, et al, chronicles applicant's efforts in the field of security devices for shopping carts. The patent to Harris et al, teaches a security device for a shopping cart utilizing a housing that is mounted to the cart in the vicinity of the wheel. A locking element supported to the housing and is selectively movable into positions engaging the cart wheel or being disengaged from the cart wheel. A motor is employed to move the element in such reciprocal motion and is operated by a controller. The controller includes a counter to determine the number of revolutions completed by the wheel, and a trigger for starting the motor upon receipt of a signal from the counter representing a preselected number of revolutions completed by the wheel.

Hence, the device of Harris, et al, is prone to both wear on the device parts and the associated wheel and is also prone to failure under the predations of certain weather conditions.

In light the foregoing, there is a need for a security device and method for transport d devices such as shopping carts, strollers or the like, that does not destroy itself nor destroy the wheel to which it is coupled under operating conditions. Additionally, there is a need for a security device and method that does not abruptly and violently lock up the transport device. Furthermore there is a need for a security device and method that is generally impervious to the predations of certain weather conditions and that substantially eliminates the problems associated with the mechanical complexities of know prior art devices.

Specifically, there is a need for a security device and method that can be repeatedly used to restrict carts to a restricted area while remaining undamaged. Additionally, there is a need for a security device and method that eliminates wheel lock up and the mechanical damages associated therewith. Furthermore, there is a need for a security device and method that eliminates the mechanical complexities associated with the known prior art devices thereby eliminating the expense unreliability and time consumption associated with maintaining these devices.

SUMMARY OF THE INVENTION

The present invention is distinguishable over the known prior art in a multiplicity of ways. For one thing, the present invention provides a security device and method that does not destroy itself nor destroy the wheel to which it is coupled under operating conditions thereby providing a security device and method that can be repeatedly used to restrict carts to a restricted area without damaging the associated wheel or the device itself. Additionally, the present invention provides a security device and method that does not abruptly and violently lock up the transport device. Furthermore, the present invention provides a security device and method that is generally impervious to the predations of certain weather conditions and that substantially eliminates the problems associated with the mechanical complexities of the know prior art devices thereby eliminating the unreliability of these devices, and the expense and time consumption associated with maintaining these devices. Moreover, the present invention provides a security device and method that eliminates the laborious, time consuming, and costly maintenance associated with known prior art devices thereby eliminating the associated customer service dissatisfaction.

Particularly, a transport device retention system is provided in the form of a security device and method that inhibits rotation or pivoting of a wheel of a transport device about a vertical pivot axis normal to the rotational axis of the wheel and fixes the wheel at an acute angle relative to the normal, forward or reverse direction of travel of the transport device. It should be noted that is was generally found that an acute angle of twenty-five degrees or greater resulted in the chance that the transport device, such as a shopping cart, would tip over on its side on lock up. When the acute angle was lowered to about twenty-one degrees shopping cart tip over was substantially eliminated. Thus, in the light of safety, the angle is preferably set below twenty-one degrees and in one preferred form the angle is about seventeen degrees, which causes a shopping cart to generally sweep a circle having approximately a ten-foot diameter.

The security device includes a housing unit comprised of a top cover and a bottom cover, a cup, collar or extension attached to a caster assembly comprised of a wheel cradled in and having an axle mounted to a forked frame, which is pivotally coupled to a mounting stud such that the forked frame and wheel can pivot about a vertical pivot axis, with the axle of the wheel (which defines an axis of rotation of the wheel) offset horizontally from the vertical pivot axis. This geometry provides a stable assembly in which the wheel axle will tend to trail the vertical pivot axis when a horizontal motive force is applied to the cart, the axle tending to align perpendicularly to the direction of motion of the cart.

The housing unit is attached to the frame of a transport device such as a cart by removing the existing caster wheel and replacing it with the security device by passing the metal mounting stud through the housing unit and operatively coupling the stud to the frame of the cart. The housing unit also includes a locking element that is capable of moving into positions to inhibit wheel rotation or swivel about the vertical pivot axis and being disengaged such that wheel movement about the vertical pivot axis is no longer inhibited. The locking element is in one form of a pin that resides in a housing in the bottom cover and is capable of sliding into and out of notches strategically formed in the cup, collar or extension. Motor means are provided for moving the element back and forth through a lever that can be cam operated. When the element is activated by the motor, the moveable element is deployed and biased against the cup or securely received in one of the cup's notches, fixing the wheel at an acute angle relative to the normal forward or reverse direction of the cart such that the cart can now only move in a circular direction. Thus, the locking element does not act as a "brake" or "stop" for the cart wheel, rather it inhibits its direction of travel to a restricted circular path.

The present invention further includes a control system for activating the motor correlative to a user-defined value or event. The control system includes a transducer that outputs signals correlative to cart motion. The control system processes the output signals and compares the results to the user defined value or event which in accordance to one aspect of the present invention results in the control system being placed in a lockup mode wherein the motor is activated as delineated hereinabove and the moveable element is deployed and securely received in one of, for example, the cup's notches or deployed and biased against the cup wherein when a certain angle of rotation of the wheel about the vertical pivot axis is achieved it causes the moveable element to be securely received in one of the cup's notches for fixing the wheel at an acute angle relative to the normal forward or reverse direction of the cart such that the cart can now only move in a circular motion.

A receiver is also employed in the control system and operates in conjunction with one or more signal transmitters. By way of example, the receiver recognizes a code originating from one or more signal transmitters. The receiver, upon receipt of the signal from one or more transmitters, can produce a signal, through a decoder which is transferred to a microcomputer capable of functioning to, inter alia, ACTIVATE, DEACTIVATE, LOCKUP, and UNLOCK the device of the present invention. The transmitter receiver combination may be employed to function in a SET DISTANCE mode thereby determining the time or distance that the cart will be permitted to travel before the LOCKUP mode is triggered.

OBJECTS OF THE INVENTION

Accordingly, it is a primary object of the present invention to provide a new and novel security device and method for a swivel caster attachable to a transport device such as a shopping cart, stroller or the like.

It is a further object of the present invention to provide a device as characterized above which is capable of electronically determining the distance traveled by the transport device and triggering a locking element to inhibit the movement of a wheel about a vertical pivot axis such that the transport device to which the wheel is attached can only move in a circular direction.

It is a further object of the present invention to provide a device as characterized above which limits the distance of travel of a transport device to preclude the transport device from being removed from a predesignated area.

It is a further object of the present invention to provide a device as characterized above which is capable of restricting the directional path of the transport device upon receipt of a signal or after having traveled a preset distance or for a preset period of time.

It is a further object of the present invention to provide a device as characterized above which is capable of operating in multiple modes and may be manipulated remotely.

It is a further object of the present invention to provide a device as characterized above which is less susceptible to weather conditions than known prior art devices.

It is a further object of the present invention to provide a device as characterized above that is less susceptible to wheel wear than known prior art devices.

It is a further object of the present invention to provide a device as characterized above which is less susceptible to vandalism than known prior art devices.

It is a further object of the present invention to provide a device as characterized above which is capable of sounding an alarm within a preset perimeter.

It is a further object of the present invention to provide a device as characterized above that lends itself to mass production and is cost effective to manufacture.

It is a further object of the present invention to provide a device and method as characterized above for a shopping cart which is passive in nature to the consumer and unobtrusively locks up into a condition wherein the cart merely feels like it is not steering properly because the radius of the circle in which the cart is traversing is large compared to the relative area within a retail store or other like structure wherein when the cart is in an area such as a parking lot the radius of the circle in which the cart traverses easily secures the shopping cart in a restricted area.

These and other objects will be made manifest when considering the following detailed specification when taken in conjunction with the appended drawing figures.

DESCRIPTION OF THE PREFERRED EMBODIMENTS

Figure 1:
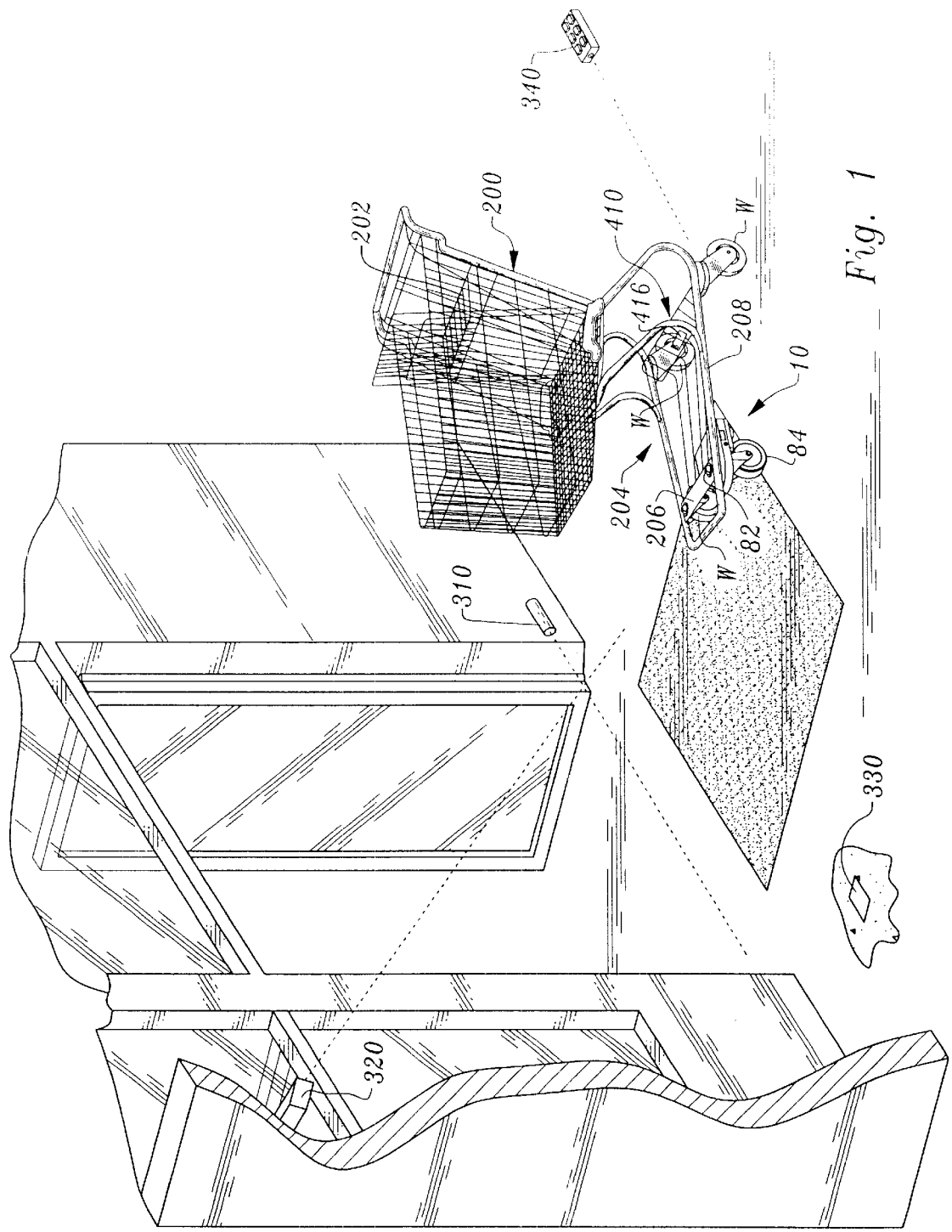
FIG. 1 is a perspective view of a security device and an anti-tilt bracket according to the present invention and shown mounted on a shopping cart, remote signal transmitters are also depicted in one possible environment.

Considering the drawings, wherein like reference numerals denote like parts throughout the various drawing figures, reference numerals 10 and 410 are directed to security devices according to the present invention.

Figure 2:
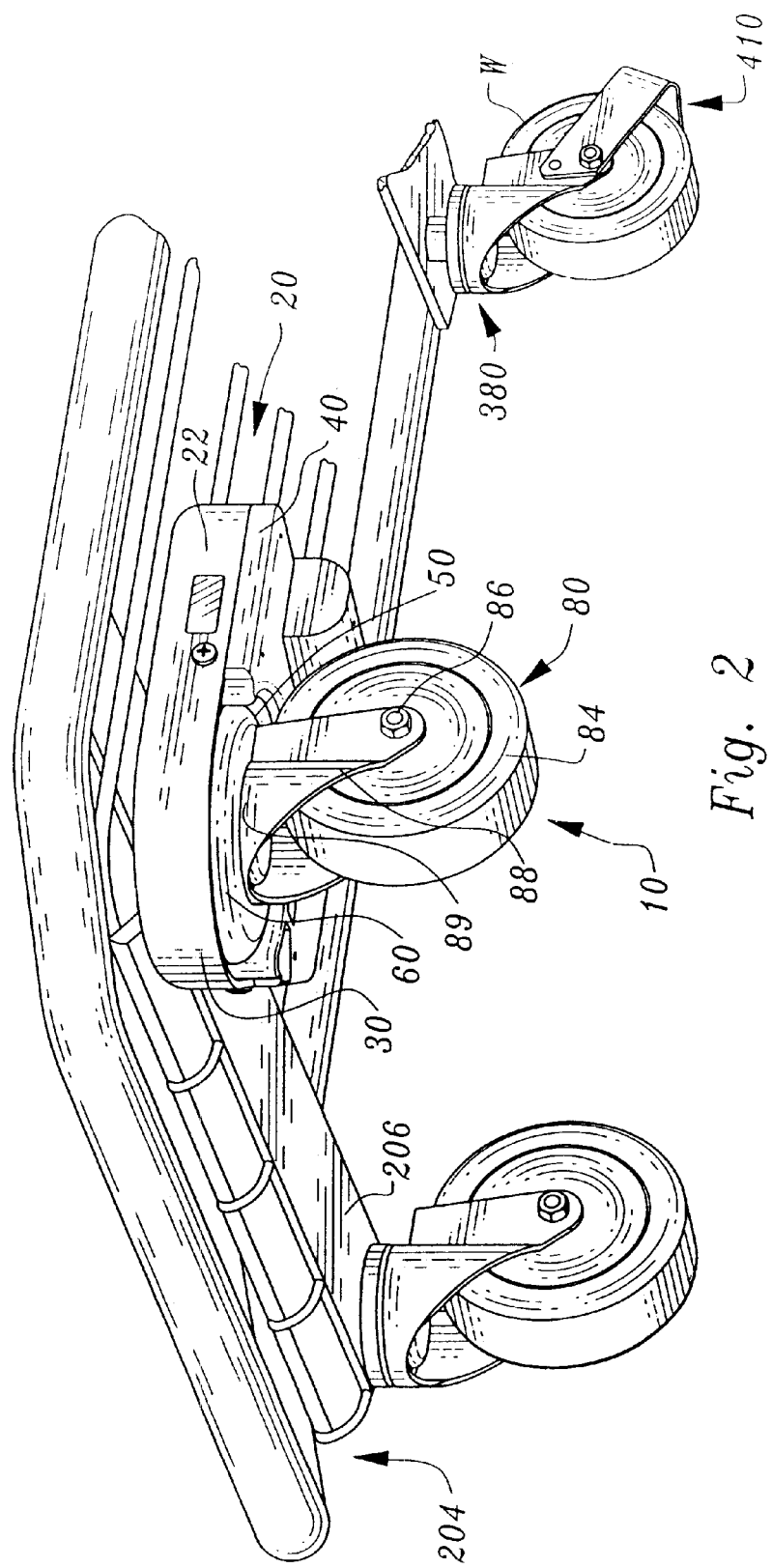
FIG. 2 is a front side perspective view of the security device and the anti-tilt bracket according to the present invention and shown mounted on the shopping cart.
Figure 3:
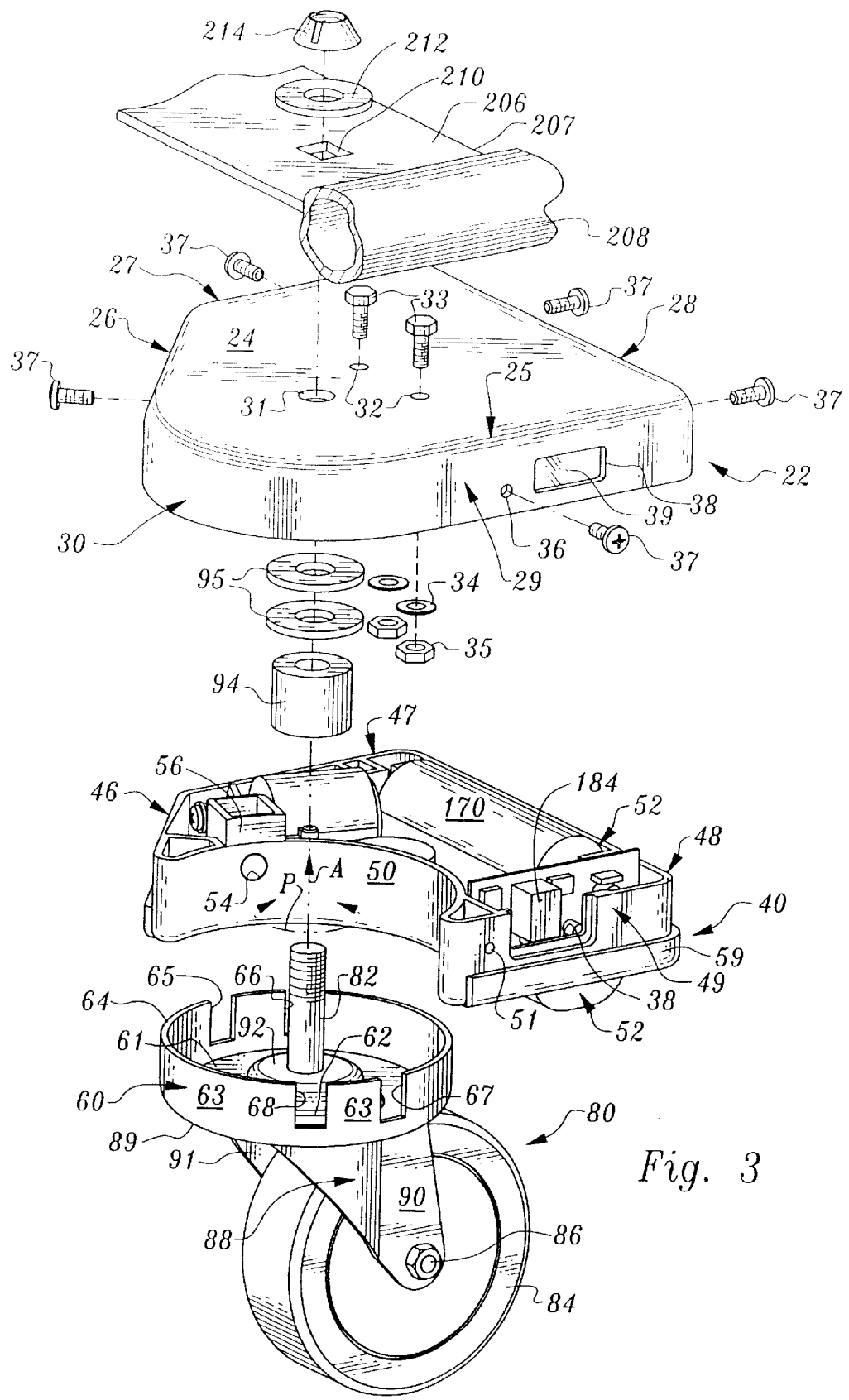
FIG. 3 is an exploded parts view of the security device according to the present invention.

In its essence, and referring to FIG. 1, the present invention relates to a security device 10 for attachment to a transport device such as, for example, a shopping cart 200 having basket 202 supported on a frame 204 having front and rear wheels W mounted thereunder. Referring to FIGS. 2 and 3, the security device 10 is comprised of a housing 20, a cup or collar member 60, a caster assembly 80 having a wheel 84, and a control system 100. The housing 20 is operatively coupled between the frame 204 of the cart 200 and the caster assembly 80. The housing 20 includes a top cover 22 having a bulbous wall 30 and a bottom cover 40 having a crescent shaped cutaway 50 wherein the bulbous wall 30 and the crescent shaped cutaway 50 of the housing 20 define a circumscribing well characterized by an open space vertically extending through the bottom cover 40 of the housing 20 for at least partially receiving the cup or collar member 60 of the device 10.

In turn, the cup or collar member 60 is surmounted on and rigidly coupled to the caster assembly 80 that is operatively coupled to a transverse member 206 of the frame 204 of the cart 200 via a mounting stud bolt 82. The control system 100 resides within the housing 20 and includes means for coacting with the cup for precluding vertical rotational motion or swiveling of the caster assembly 80 about a vertical pivot axis while allowing free wheel rotation wherein cart travel is restricted to a limited circular path of travel. The present invention also includes remote signal transmitters 310, 320, 330, 340 (FIG. 1) for transmitting signals to the security device 10 under user control or at a predetermined, preset time or event.

Referring to back to FIG. 1, the present invention further includes an anti-tip device or bracket 410 rigidly coupled to a back of the cart 200 for precluding tipping of the cart 200 in order to redistribute the weight of the cart 200 onto the rear rotatable wheels W of the cart 200 in an attempt to circumvent the device 10.

More specifically, and referring to FIGS. 2 and 3, the housing 20 includes top housing cover 22 comprised of a planar top surface or ceiling 24 having an outer periphery 25 transitioning into four downwardly extending sidewalls 26, 27, 28, and 29. Sidewalls 26 and 29 meet at a forward most point of the top cover 22 to form a rounded bulbous wall 30. This bulbous wall 30 is thus formed to accommodate the shape of bottom cover 40, cup or collar member 60 and caster assembly 80. A stud hole 31 and guide stop holes 32 are formed in ceiling 24 of top cover 22 and are strategically placed to accommodate the mounting stud bolt 82 of the caster assembly 80 and two guide stops which may be formed from hex head bolts, rivets, steel pins and the like. For example, hex head bolts 33, washers 34 and nuts 35 can be employed as guide stops and can be attached to the top cover 22 of the housing via guide stop holes 32 wherein a portion of each guide stop abuts a back edge 207 of the transverse member 206 for securing and guiding housing installation. Sidewalls 26, 27, 28, and 29 also have holes 36 formed therein to receive screws 37. Screws 37 are preferably security head screws, for example security TORX head screws, which are formed with a special head such that a specially made bit must be used in order to remove these screws from the security device 10 once it is assembled. A rectangular-shaped cutaway 38 is formed in sidewall 29, preferably located near the rearmost corner thereof. The cutaway 38 is formed to receive window 39 that is preferably formed from infrared sensitive material, for example, red acrylic or plastic such that it will favorably allow the through passage of an infrared signal to the control system 100, to be discussed below.

Still referring to FIGS. 2 and 3, the bottom cover 40 is preferably formed from durable plastic and is shaped such that it securely resides within the top cover 22 as shown in FIG. 2.

Figure 4:
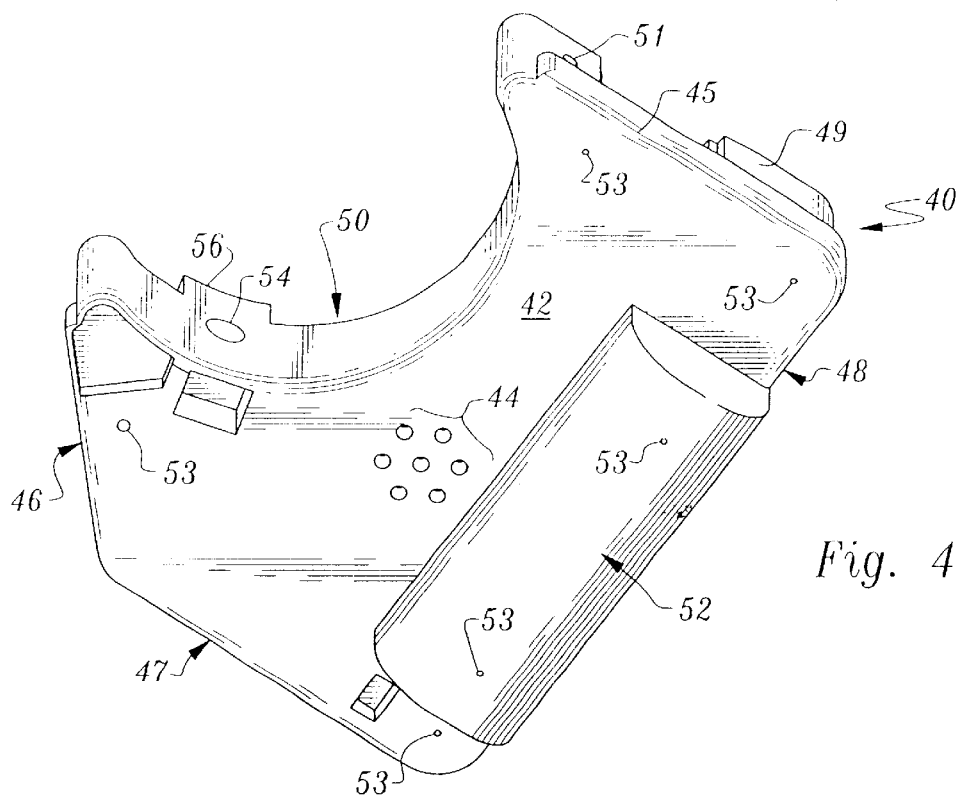
FIG. 4 is a perspective exterior view of a bottom housing cover according to the present invention.

Accordingly, and referring to FIGS. 3 and 4, the bottom cover 40 is comprised of a bottom surface or floor 42 having perforations 44 disposed therein. The bottom surface 42 includes an outer periphery 45 transitioning into four upwardly extending sidewalls 46, 47, 48, and 49 which are complemental to the top cover sidewalls 26, 27, 28, and 29 when assembled. However, rather than bulbous wall 30 of top cover 22, bottom cover 40 includes a crescent-shaped cutaway section 50 forming an open section to favorably receive the cup 60 and caster assembly 80 and securely reside within the top cover 22 when the security device 10 is assembled. The bottom cover 40 also includes holes 51 formed in sidewalls 46, 47, 48, and 49 that are complemental to the top cover holes 36 formed in sidewalls 26, 27, 28, and 29 for receiving screws 37. Perforations 44 are employed as a series of speaker holes formed in the floor 42 of bottom cover 40 (FIG. 4) to preclude the sound of an activated alarm (to be discussed below) from being muffled by the assembled security device 10. Floor 42 further includes a bay 52 along sidewall 48 that is formed to house a source of power to be discussed below. The bay 52 includes two weep holes 53 formed therein providing a means for the release of moisture that may accumulate inside of the device 10. Weep holes 53 are also provided in the corners of floor 42 for further allowing the through dissipation of moisture that may accumulate in the assembled security device 10 during use. A bore 54 for through passage of a locking pin (to be discussed below) is formed in the left-hand portion of crescent-shaped wall 50. A square-shaped tower 56 is formed with wall 50, strategically located immediately behind and above bore 54 for receiving a pin housing to be discussed infra. A ledge 59 (FIG. 3) is formed about the lowermost outer periphery 45 of walls 46, 47, 48, and 49 such that when top cover 22 is slipped over bottom cover 40, the bottom cover 40 fixedly and securely resides therein.

Referring back to FIG. 2, the cup or collar member 60 is shown surmounting the caster assembly 80 and securely nested within the crescent-shaped wall 50 of bottom cover 40 and within the bulbous shaped wall 30 of top cover 22.

Referring now to FIG. 3, cup member 60 can include a floor 61 with a hole 62 formed in the center thereof to receive caster assembly 80 and the mounting stud bolt 82. Cup member 60 further is formed by a circularly shaped sidewall 63 transitioning and upwardly extending from floor 61. Sidewall 63 preferably includes at least four openings or notches 65, 66, 67, 68 strategically and circumferentially formed within the sidewall at predetermined locations to allow the entry and exit of a locking pin of the security device 10 to be discussed below.

The caster assembly 80 is comprised of a wheel 84 cradled in and having an axle 86 mounted to a forked frame 88, which is pivotally coupled to the mounting stud bolt 82 such that the forked frame 88 and wheel 84 can pivot along double ended arrow P and about a vertical pivot axis A, with the axle 86 of the wheel 84 (which defines an axis of rotation of the wheel) offset horizontally from the vertical pivot axis A.

More specifically, the forked frame 88 is comprised of a top portion 89 (FIG. 2) and two spaced apart flanges 90. 91 downwardly depending from top portion 89 such that the two flanges cradle the wheel 84 and the axle 86 is mounted to the two flanges. The axle 86 can be mounted to the two flanges 90, 91 via a button head bolt 86 that is secured on the opposite side thereof via a security nut. Alternatively, a rivet may be used in place of head bolt 86 and security nut. The security nut prevents removal of the wheel 84 from the cart by unauthorized individuals.

In turn, the top portion 89 of frame 88 includes a hub 92 that is formed to receive a ball bearing type bushing through which the mounting stud-bolt 82 is inserted and pivotably mounted for operative attachment to the cart 200 via passage of the mounting stud bolt 82 through the housing 20 of the security device 10. The hub 92 and the received ball bearing type bushing through which the stud bolt 82 passes are well known in the art. A spacer 94 fits over stud bolt 82 and resides on caster hub 92. The spacer 94 isolates the cup 60 and caster assembly 80 from the housing 20 so that the cup 60 will not restrict movement of the caster assembly 80. Immediately above spacer 94, shims 95 may be utilized to adjust the length of distance between attachment point of the security device 110 on cart 200 via transverse member 206 upon which the security device 10 is to be attached. These shims 95 are utilized to raise or lower the height of the security device 10 for leveling the cart 200 such that preferably the wheel 84 of the security device 10 is higher than the opposite front wheel of the cart 200. In addition, shims 95 may also be placed between the mounting stud bolt hole 31 of top cover ceiling 24 and hole 210 formed in transverse member 206 of cart 200. It is to be noted that shims 95 are not required, but may be used to adjust the length of distance between attachment of the security device with reference to the length of the stud 82 and the particular cart 200 upon which the security device 10 is to be attached.

The cup member 60 is rigidly attached to (or can be integrally formed with) the caster assembly 80. Spacer 94 and shims 95 (if necessary) are placed on caster hub 92 and then the mounting stud bolt 82 is aligned with and passed through hole 31 in top cover 22 of the housing and through hole 210 in transverse member 206 wherein a nut 214 threadedly couples to the mounting stud bolt 82 such that the device 10 is aligned and securely coupled to the shopping cart 200 as shown in FIG. 2. A washer 212 may be interposed between nut 214 and transverse member 206.

Figure 5:
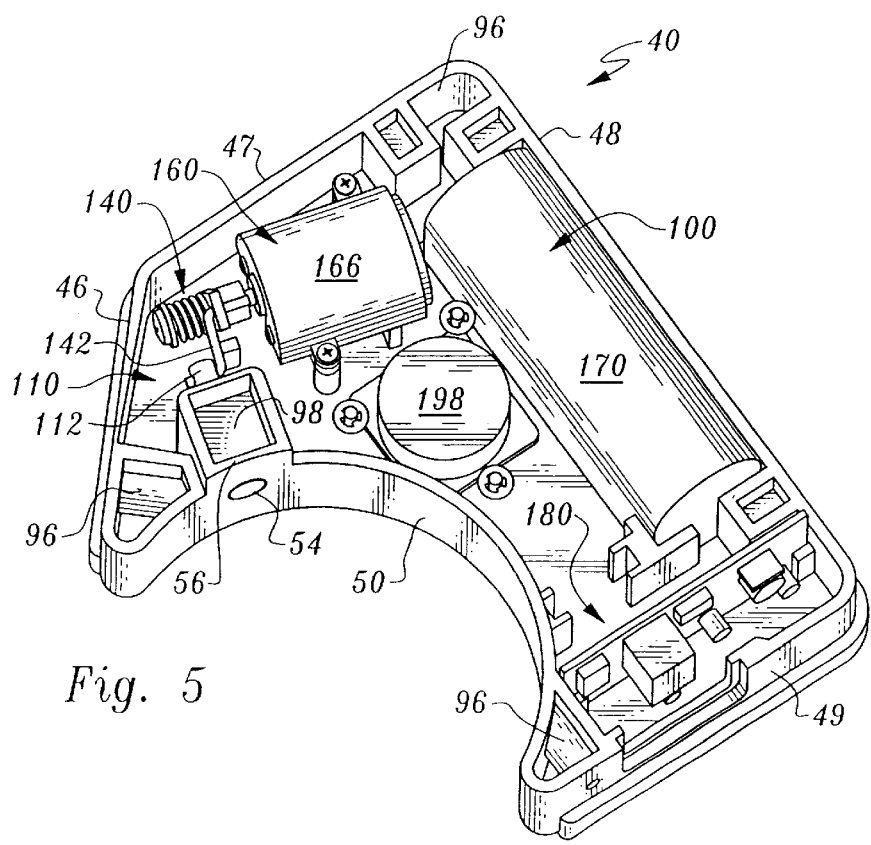
FIG. 5 is an interior view of the bottom housing cover with control system parts of the security device assembled therein.

FIG. 5 shows further details of the bottom housing cover 40 including hollows 96 that are formed in the two corners that traverse crescent wall 50 and in the corner that traverses walls 47 and 48. Additionally, a pin housing 98 is formed adjacent hollow 96 near wall 46. Pin housing 98 is a square-tower shaped structure that abuts crescent wall 36 on one side of the pin housing at its tower 56. Pin housing 98 also includes holes 53, 54 connected by a through bore 55 extending through the pin housing 98 thereby proving open communication between the two holes 53, 54.

Figure 6:
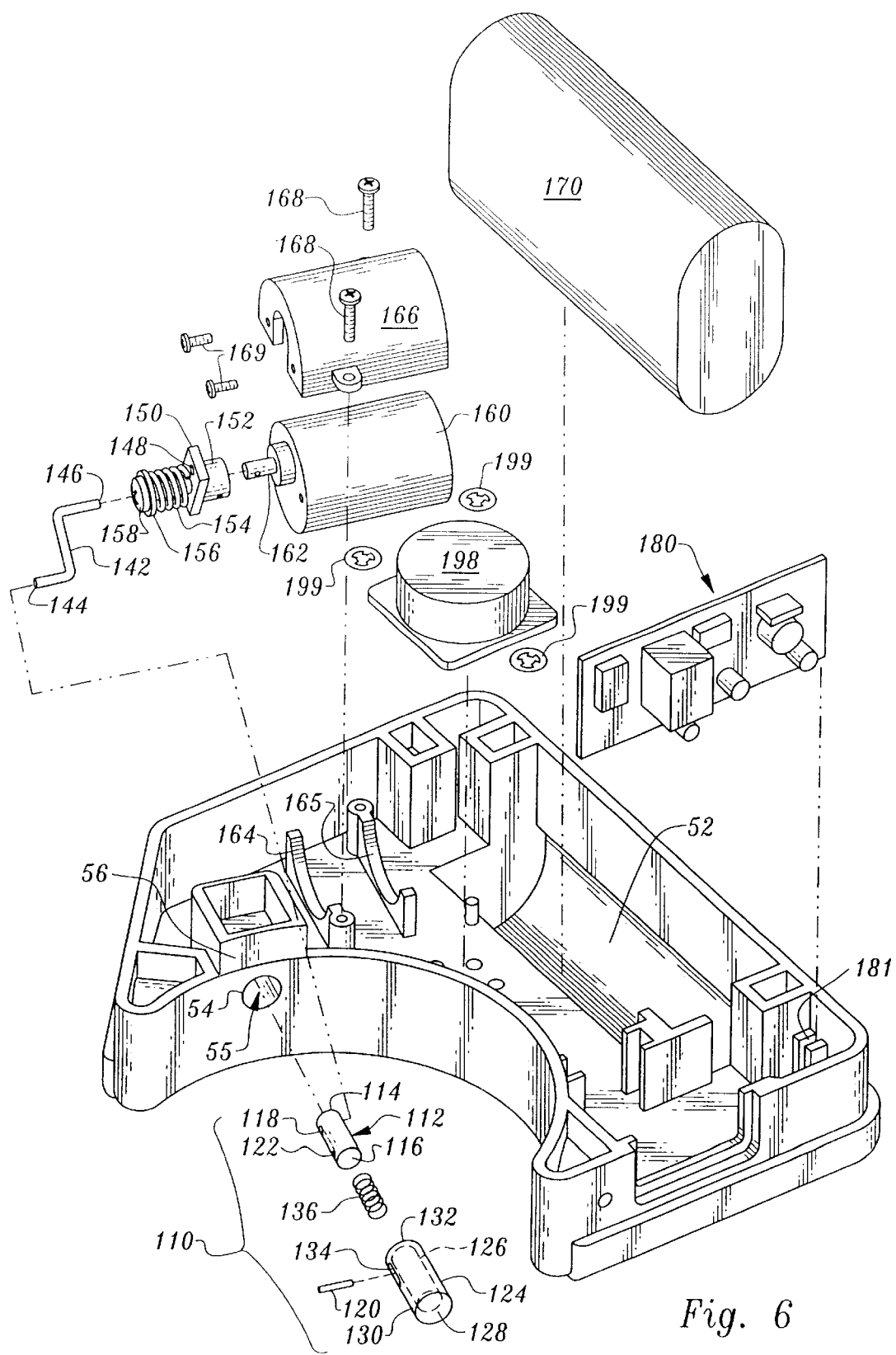
FIG. 6 is an exploded parts view of the system parts in relation to their placement in the interior of the bottom housing cover according to the present invention.

Referring now to FIGS. 5 and 6, the interior of bottom housing cover 40 is shown with the control system 100 comprised of a locking assembly 110, a linkage assembly 140, a motor 160, a power supply 170, and processor/controller assembly 180 installed therein (FIG. 4) and in an exploded parts view (FIG. 5).

Particularly, the processor/controller assembly 180 is installed in slot 181 and is electrically coupled to the power supply or battery 170 that is received in bay 52. The processor/controller assembly 180 is also electrically coupled to a piezo buzzer or alarm 198 that is secured to the bottom housing cover 140 by fasteners 199. The motor 160 is cradled in motor mounts 164, 165 and is covered by motor cover 166, which in turn, is secured to the motor mounts 164, 165 by screws 168 and 169. Hence, the motor mount 160 is fixedly secured to the bottom housing cover 40.

Referring to FIG. 6, the locking assembly 110 is comprised of a first elongated member or locking pin follower 112 having a first end 114 and a second end 116. The first elongated member 112 includes a hole 118 disposed therethrough at alocation proximate its first end 114 and at an angle normal to a long axis of member 112. The first elongated member 112 further includes a stop or pin 120 pressed through a hole 122 disposed at a location proximate its second end 116 and at an angle normal to the long axis of member 112. The locking pin 120 is further comprised of a second elongated member or locking pin 124 having a hollow blind bore 126 sized to telescopically receive the first member 112 and defined by a closed forward most end 128 transitioning into a hollow cylindrical sidewall 130 terminating into an opened rearward most end 132. The second member 124 further includes a pair of elongated slots 134 (also see FIGS. 15 through 17) concentrically disposed through the cylindrical sidewall 130 such that a spring 136 can be captured between the two members 112, 124 by placing the spring 130 into the blind bore 126, placing the first elongated member 112 into the blind bore 126 via the opened rearward most end 132 of the second member 124 and compressing the spring 130 until the pin opening 122 is in open communication with the concentrically disposed slots 134 such that the pin 120 can be pressed through the pin opening 122 and can be received within the slots 134 such that when the first member or locking pin follower 112 and the second member or locking pin 124 are free the spring pushes the members 112, 124 apart and biases the pin 124 against the back of the slots 134 proximate the opened end 132 of the second member 124 as exemplified in FIGS. 15 and 17. Additionally, when the second member or locking pin 124 is held stationary and the first member or locking pin follower 112 is pushed into the second member 124 the spring 136 compresses and potential energy is stored in the spring 136 as exemplified in FIG. 16. The first member or locking pin follower 112 is allowed to telescope into the second member or locking pin 124 until the pin 120 abuts against the front of the slots 134 distal from the opened end 132 of the locking pin 124.

Referring again to FIGS. 5 and 6, the locking assembly 110 is operatively coupled to the motor 160 via a linkage assembly 140 comprised of a drive link 142 coupling the locking pin follower 112 to the motor 160 by having one end 144 coupled to the hole 118 disposed in locking pin follower 112 and curving back in a z-shaped configuration such that its opposite end 146 fixedly resides in a hole 148 formed in a cam disc spindle 150 disposed on a shaft 162 of the motor 160.

Figure 7:
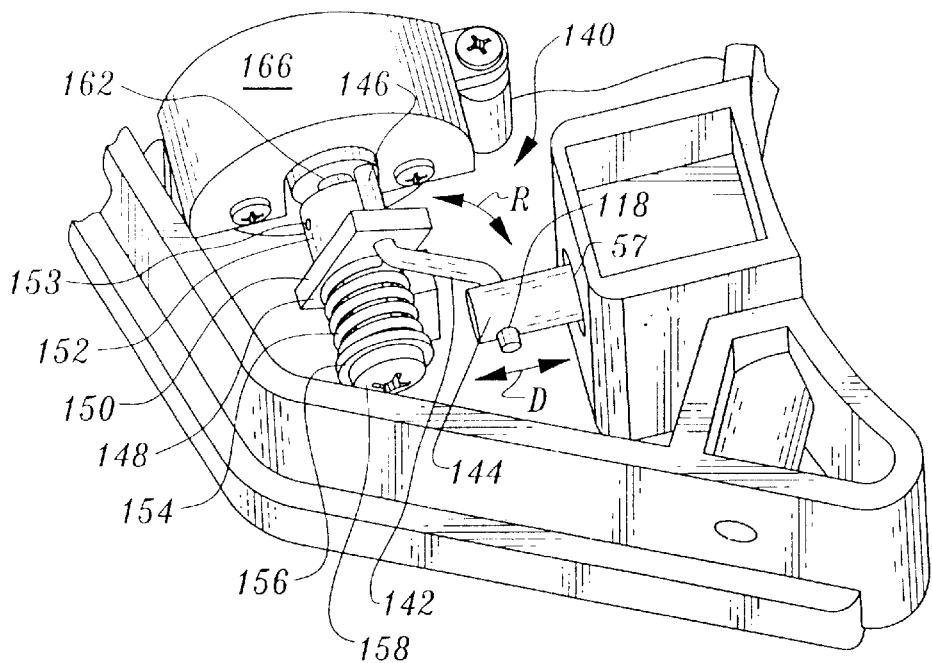
FIG. 7 is an elevational view showing detail of a locking assembly, a linkage assembly, and a motor with the locking assembly in an unlocked position.

Particularly, and referring to FIG. 7, the motor 160 includes the shaft 162 upon which resides a mounting spacer 152, the cam disc spindle 150 and cam disc spring 154, all of which are formed as a subassembly secured to shaft 162 by end shaft tensioning screw 158. The spacer 152 is attached to shaft 162 via motor cotter pin 153 pressed through a cotter pin hole formed in spacer 152. An oversized washer 156 resides between tensioning screw 158 and spring 154 to prevent the spring 154 from slipping over the head of the tensioning screw 158. Note that the drive link 142 is preferably fixedly attached to the disc spindle 150 and terminates before reaching a front wall of the motor cover 166.

It should be noted that FIG. 7 depicts the security device 10 in an uninhibited state, i.e., the locking pin assembly 110 (shown in FIGS. 5 and 6) has not been actuated or is in an initial quiescent state.

Figure 8:
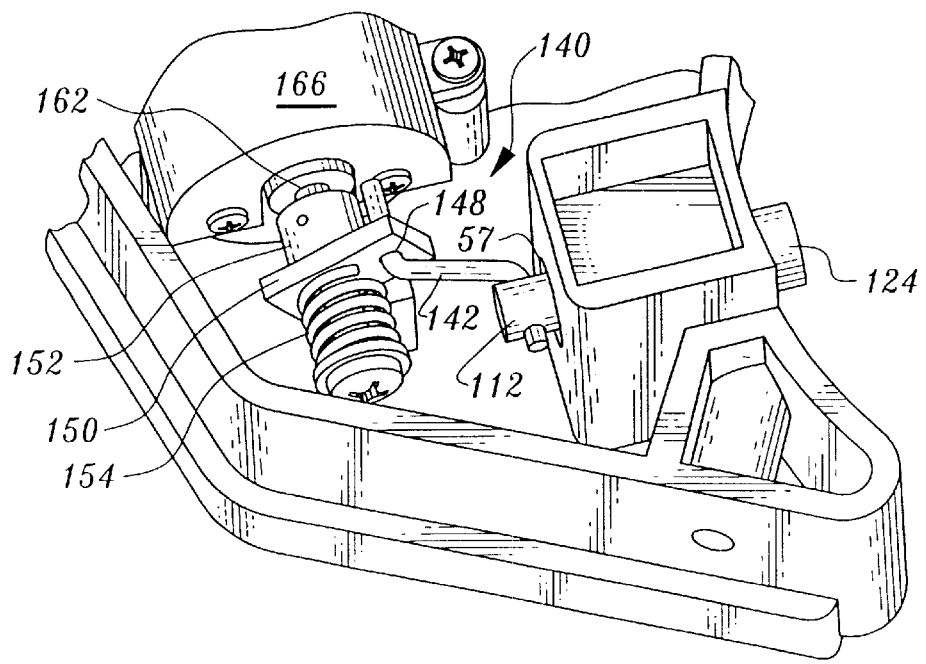
FIG. 8 is an elevational view showing detail of the locking assembly, the linkage assembly, and the motor with the locking assembly in a locked position.

FIG. 8 depicts the security device 10 in an inhibited state. When the motor 160 is activated by the processor/controller 180 to assume an inhibited state, the shaft 162 rotates for a fixed period of time (reverse or forward limit) thereby driving the subassembly comprised of spacer 152, spindle 150 and spring 154 such that the orchestrated rotation in one direction of the subassembly about the curved arrow R shown in FIG. 7 causes the drive link 142 to turn thereby moving the pin follower 112, locking pin spring 136 (FIG. 5), and locking pin 124 to move in a forward direction of travel or in one direction of arrow D shown in FIG. 7 for effecting a lock up state wherein the locking pin assembly 110 returns to final quiescent state.

Figure 9:
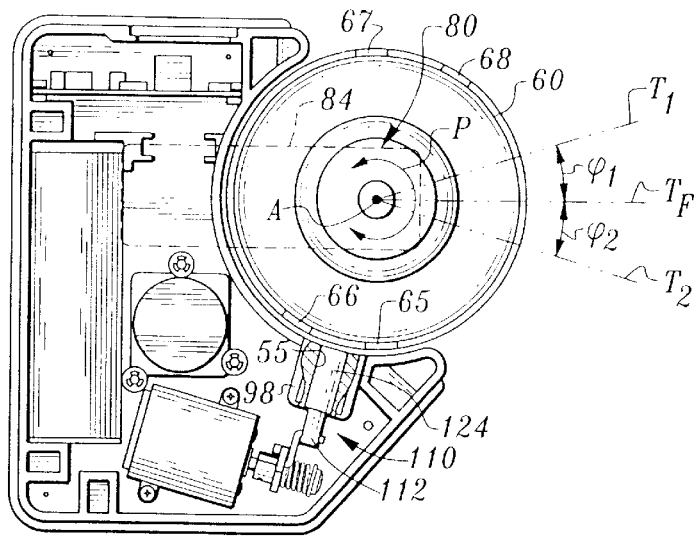
FIG. 9 is an elevational view showing detail of the locking assembly and a cup of the present invention wherein the locking assembly is in an uninhibited position allowing free rotation of the cup along double ended arrow P and about axis A and further showing a position of a caster wheel in phantom when the cart is traveling forward.

Referring now to FIG. 9, an elevational interior view of the device 10 is depicted with the top housing cover 22 removed therefrom showing the locking assembly 110 in an uninhibited or initial quiescent state allowing free rotation of the cup 60 and caster assembly 80 and further showing a position of the caster wheel 84 in phantom when the transport device or cart 200 is traveling forward in the direction of vector T. The locking pin 124 is slideably located within the bore 55 of the tower 98 and is spaced away from the cup 60 at a location interposed between notches 65 and 66 thereby being in an initial quiescent state.

Figure 10:
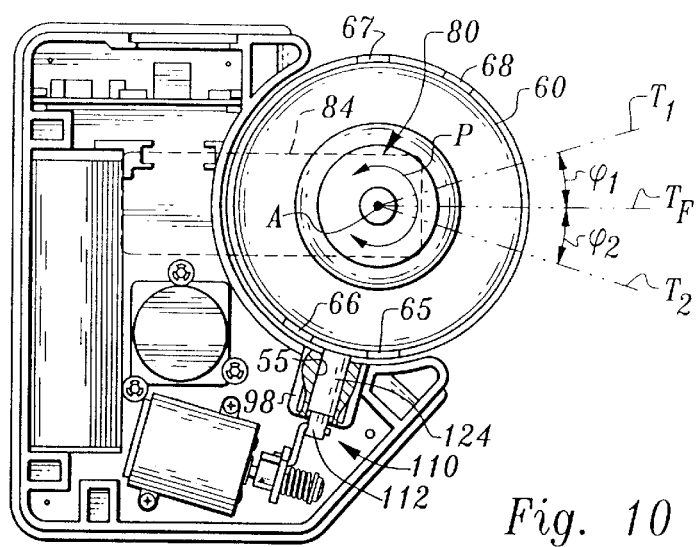
FIG. 10 is an elevational view showing detail of the locking assembly and the cup of the present invention wherein the locking assembly is in a locked position and biased against the cup.

FIG. 10 depicts an elevational view showing detail of the locking assembly 110 and the cup 60 of the present invention wherein the locking assembly 110 has moved from a first position shown in FIG. 9 to a second activated position shown in FIG. 10 wherein the locking pin 124 is biased against the cup 60. Thus, the device 10 has gone from the initial quiescent state to a potential energy storage state wherein when the locking pin 124 comes into abutment under the drive of the linkage assembly 140 and then the motor, under the control of the processor/controller 180, continues to drive the linkage assembly 140 for a certain period of time such that the spring or energy storage means 136 is compressed between the locking pin follower 112 operatively coupled to the linkage assembly 140 and the locking pin 124 thereby retaining the spring or energy storage means in an activated state for retaining a biased abutment of locking pin 124 with cup 60. A certain acute angle (shown as ($\phi_1$ and $\phi_2$ in FIG. 9) swivel or pivot of the caster 80 along double ended arrow P and about pivot axis A will result in the spring or energy storage means 136 being released from an active state wherein the energy from the spring or energy storage means 136 injects the locking pin 124 into one of the two notches 65, 66 with the locking pin follower 112.being held by linkage assembly 140 such that the device goes into a lock up condition and the locking pin assembly 110 goes into a final quiescent state thereby resulting in the cart 200 being placed in an inhibited state and traveling in a circular direction with the wheel substantially positioned in the direction of either vector $T_1$ or $T_2$ depending on swivel direction. Hence, the cart 200 can be restricted by device 10 without physically locking up wheel rotation thereby eliminating, inter alia, wheel and device damage associated with known prior art devices.

Figure 11:
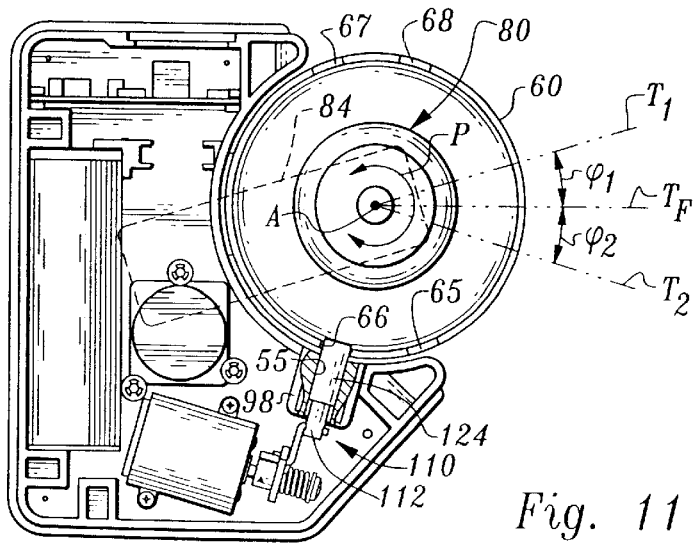
FIG. 11 is an elevational view showing detail of the locking assembly and the cup of the present invention wherein the locking assembly is in a locked position and a locking pin is received within a notch of the cup in one possible direction of rotation of the cup.

FIG. 11 is illustrative of the above delineated lock up condition, and depicts an elevational interior view of the device 10 wherein the top housing cover 22 is removed therefrom showing the locking assembly 110 in an inhibited or locked state wherein the locking pin 124 is received within notch 66 of the cup 60 in one possible direction of rotation of the cup along an arcuate path having an acute angle $\phi_1$ for restricting free rotation of the cup 60 and caster assembly 80 thereby resulting in the cart 200 being placed in the inhibited state and traveling in a circular direction with the wheel substantially positioned in the direction of vector $T_1$.

Figure 12:
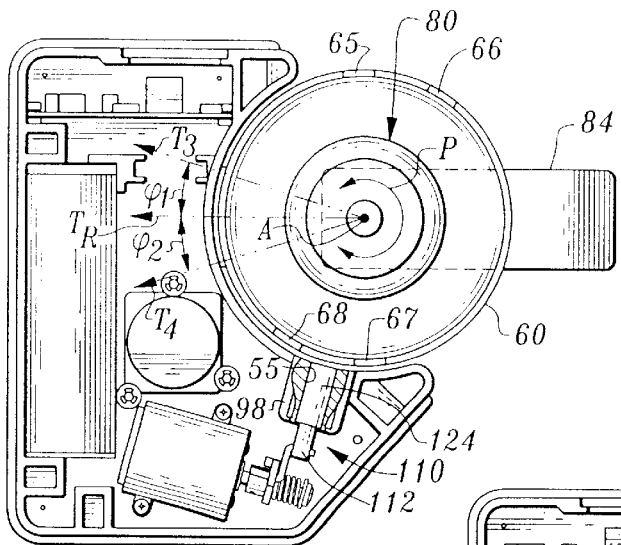
FIG. 12 is an elevational view showing detail of the locking assembly and the cup of the present invention wherein the locking assembly is in an uninhibited position allowing free rotation of the cup and further showing a position of the caster wheel in phantom when the cart is traveling in reverse or in an opposite direction of travel to that which is shown in FIG. 9.

Referring now to FIG. 12 is an elevational interior view of the security device 10 depicted with the top housing cover 22 removed therefrom showing detail of the locking assembly 110 and the cup 60 of the present invention wherein the locking assembly is in an in an uninhibited or initial quiescent state allowing free rotation of the cup 60 and caster assembly 80 and further showing a position of the caster wheel 84 in phantom when the cart 200 is traveling in reverse along the direction of vector $T_R$ or in an opposite direction of travel from that which is shown in FIG. 9. The locking pin 124 is slideably located within the bore 55 of the tower 98 and is spaced away from the cup 60 at a location interposed between notches 67 and 68 thereby being in an initial quiescent state. Note that notches 65 and 66 are diametrically opposed to notches 67 and 68. Specifically, notch 65 is diametrically opposed to notch 67 and notch 66 is diametrically opposed to notch 68.

Figure 13:
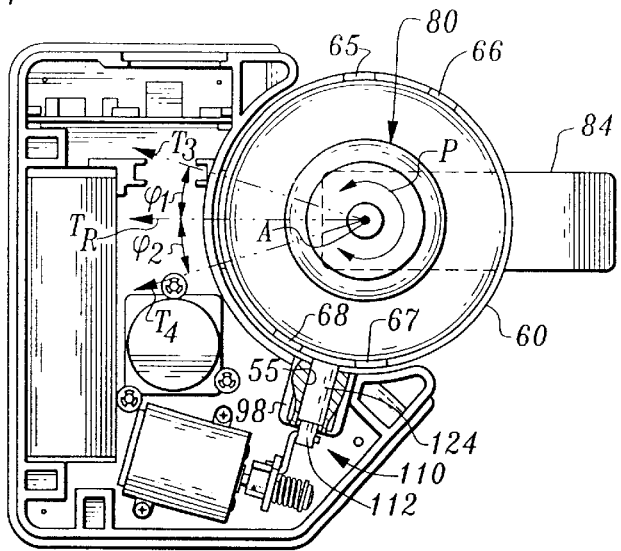
FIG. 13 is an elevational view showing detail of the locking assembly and the cup of the present invention wherein the locking assembly is in a locked position and biased against the cup and further showing a position of the caster wheel in phantom when the cart is traveling in reverse or in an opposite direction of travel to that which is shown in FIG. 9.

FIG. 13 is an elevational interior view of the security device 10 depicted with the top housing cover 22 removed therefrom showing detail of the locking assembly 110 and the cup 60 of the present invention wherein the locking assembly is in an activated state and the locking pin 124 is biased against the cup 60 and further showing a position of the caster wheel 84 in phantom when the cart 200 is traveling in reverse along the direction of vector $T_R$ or in an opposite direction of travel from that which is shown in FIG. 9.

More specifically, FIG. 13 depicts an elevational view showing detail of the locking assembly 110 and the cup 60 of the present invention wherein the locking assembly 110 has moved from a first position shown in FIG. 12 to a second activated position shown in FIG. 13 wherein the locking pin 124 is biased against the cup 60. Thus, the device 10 has gone from the initial quiescent state to a potential energy storage state wherein when the locking pin 124 comes into abutment under the drive of the linkage assembly 140 and then the motor 160, under the control of the processor/ controller 180, continues to drive the linkage assembly 140 for a remaining period of time such that the spring or energy storage means 136 is compressed between the locking pin follower 112 operatively coupled to the linkage assembly 140 and the locking pin 124 thereby retaining the spring or energy storage means in an activated state for retaining a biased abutment of locking pin 124 with cup 60. A certain acute angle (shown as $\phi_3$ and $\phi_4$ in FIG. 12) swivel or pivot of the caster 80 along double ended arrow P and about pivot axis A will result in the spring or energy storage means 136 being released from an active state wherein the energy from the spring or energy storage means 136 injects the locking pin 124 into one of the two notches 67, 68 with the locking pin follower 112 being held by linkage assembly 140 such that the device 10 goes into a lock up condition and the pin assembly 110 goes into a final quiescent state thereby resulting in the cart 200 being placed in an inhibited state and traveling in a circular direction with the wheel substantially positioned in the direction of either vector $T_3$ or $T_4$ depending on swivel direction. Hence, the cart 200 can be restricted by device 10 when traveling in the reverse direction without physically locking up wheel rotation thereby eliminating, inter alia, wheel and device damage associated with known prior art devices.

Figure 14:
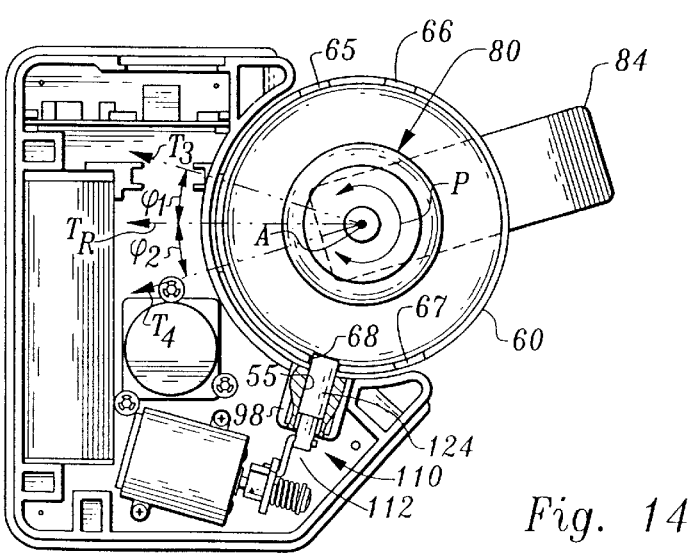
FIG. 14 is an elevational view showing detail of the locking assembly and the cup of the present invention wherein the locking assembly is in a locked position and a locking pin is received within a notch of the cup in one possible direction of rotation of the cup and further showing a position of a caster wheel in phantom when the cart is traveling in reverse or in an opposite direction of travel to that which is shown in FIG. 9.

FIG. 14 is illustrative of the above delineated lock up condition, and depicts an elevational interior view of the device 10 wherein the top housing cover 22 is removed therefrom showing the locking assembly 110 in an inhibited or locked state wherein the locking pin 124 is received within notch 68 of the cup 60 in one possible direction of rotation of the cup along an arcuate path having an acute angle $\phi_4$ for restricting free rotation of the cup 60 and caster assembly 80 thereby resulting in the cart 200 being placed in the inhibited state and traveling in a circular direction with the wheel substantially positioned in the direction of vector $T_4$.

Figure 15:
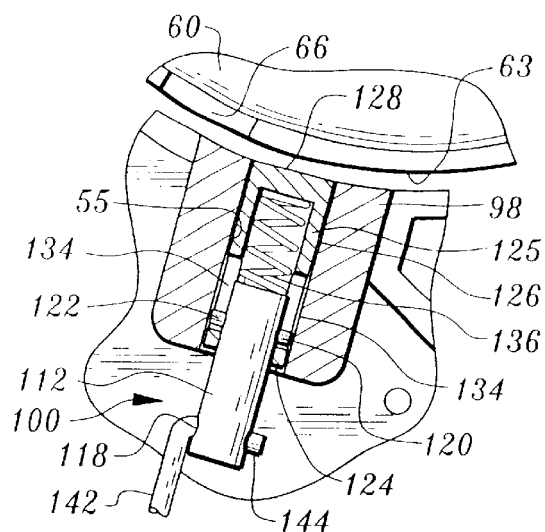
FIG. 15 is a sectional view of the locking assembly in the unlocked position.

FIG. 15 depicts a sectional view of the locking assembly 110 in the unlocked position showing the locking pin 124 slideably located within the bore 55 of the tower 98 and is spaced away from the cup 60 at a location interposed between notches 65 and 66 thereby being in an initial quiescent state. The pin follower 112 shown telescopically, received within the locking pin 124 and the pin or stop 120 is shown received within the slots 134 such that spring 136 pushes the members 112, 125 apart and biases the pin 120 against the back of the slots 134. Hence, the motor 160 and the drive linkage assembly 140 are in a first position at an initial quiescent state allowing free rotation of the cup 60 and caster assembly 80.

Figure 16:
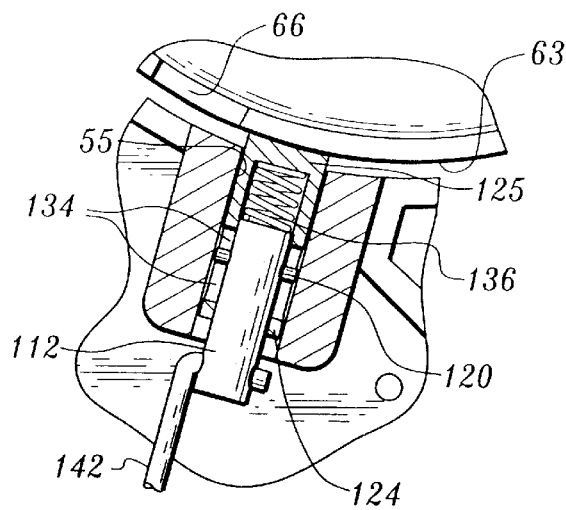
FIG. 16 is a sectional view of the locking assembly in the locked position and biased against the cup.

FIG. 16 is a sectional view of the locking assembly 110 in the locked biased position wherein the motor 160 and the drive linkage assembly 140 have moved from the first position, at the initial quiescent state, two a second activated position wherein the spring 136 is compressed and the locking pin 124 is biased against surface 63 of the cup 60. Thus, the processor/controller 180 has driven the motor 160 according to, for example, a user defined period or time such that the locking pin 124 slides within the bore 55 of the tower 98 and comes into abutment with surface 63 of cup 60 under the drive of the linkage assembly 140. The motor 160, under the control of the processor/controller 180, continues to drive the linkage assembly 140 for the remaining user defined period or time such that the spring or energy storage means 136 is compressed between the locking pin follower 112 operatively coupled to the linkage assemble 140 and the locking pin 124 thereby retaining the spring or energy storage means in an activated state for retaining the biased abutment of locking pin 124 with surface 63 of cup 60.

Figure 17:
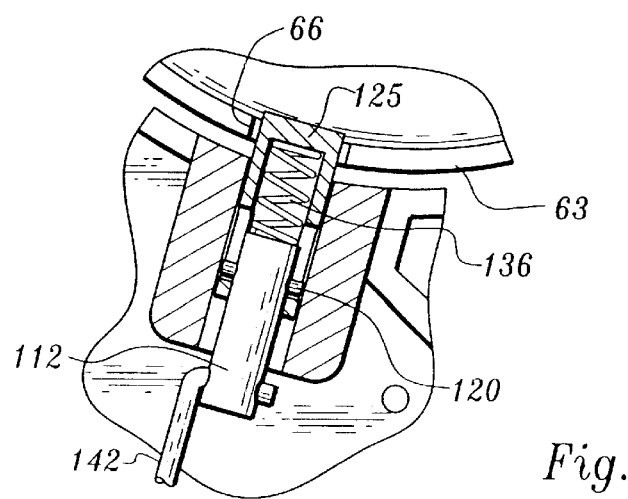
FIG. 17 is a sectional view of the locking assembly in the locked position and received within a notch of the cup.

FIG. 17 depicts a sectional view of the locking assembly 110 in the inhibited or locked state and showing the motor 160 and the drive linkage assembly 140 in the second activated position wherein the locking pin 124 is received within notch 66 of the cup 60 in one possible direction of rotation of the cup along the arcuate path having the acute angle $\phi_1$ (FIG. 11) for restricting free rotation of the cup 60 and caster assembly 80 thereby resulting in the cart 200 being placed in the inhibited state and traveling in a circular direction with the wheel substantially positioned in the direction of vector $T_1$ (FIG. 11). Note that the pin follower 112 is shown telescopically received within the locking pin 124 and the pin or stop 120 is shown received within the slots 134 such that spring 136 pushes the members 112, 124 apart and biases the pin 120 against the back of the slots 134. Hence the locking pin assembly 110 goes into the final quiescent state thereby resulting in the cart 200 being placed in the inhibited state and traveling in a circular direction with the wheel substantially positioned in the direction of vector $T_1$ (FIG. 11).

It should be noted again that is was generally found that an acute angle of twenty-five degrees or greater resulted in the chance that the transport device, such as a shopping cart, would tip over on its side on lock up. When the acute angle was lowered to about twenty-one degrees shopping cart tip over was substantially eliminated. Thus, in the light of safety, the angle is preferably set below twenty-one degrees and in one preferred form the angle is about seventeen degrees, which causes a shopping cart to generally sweep a circle having approximately a ten-foot diameter when in lock up in accordance with the present invention.

Figure 18:
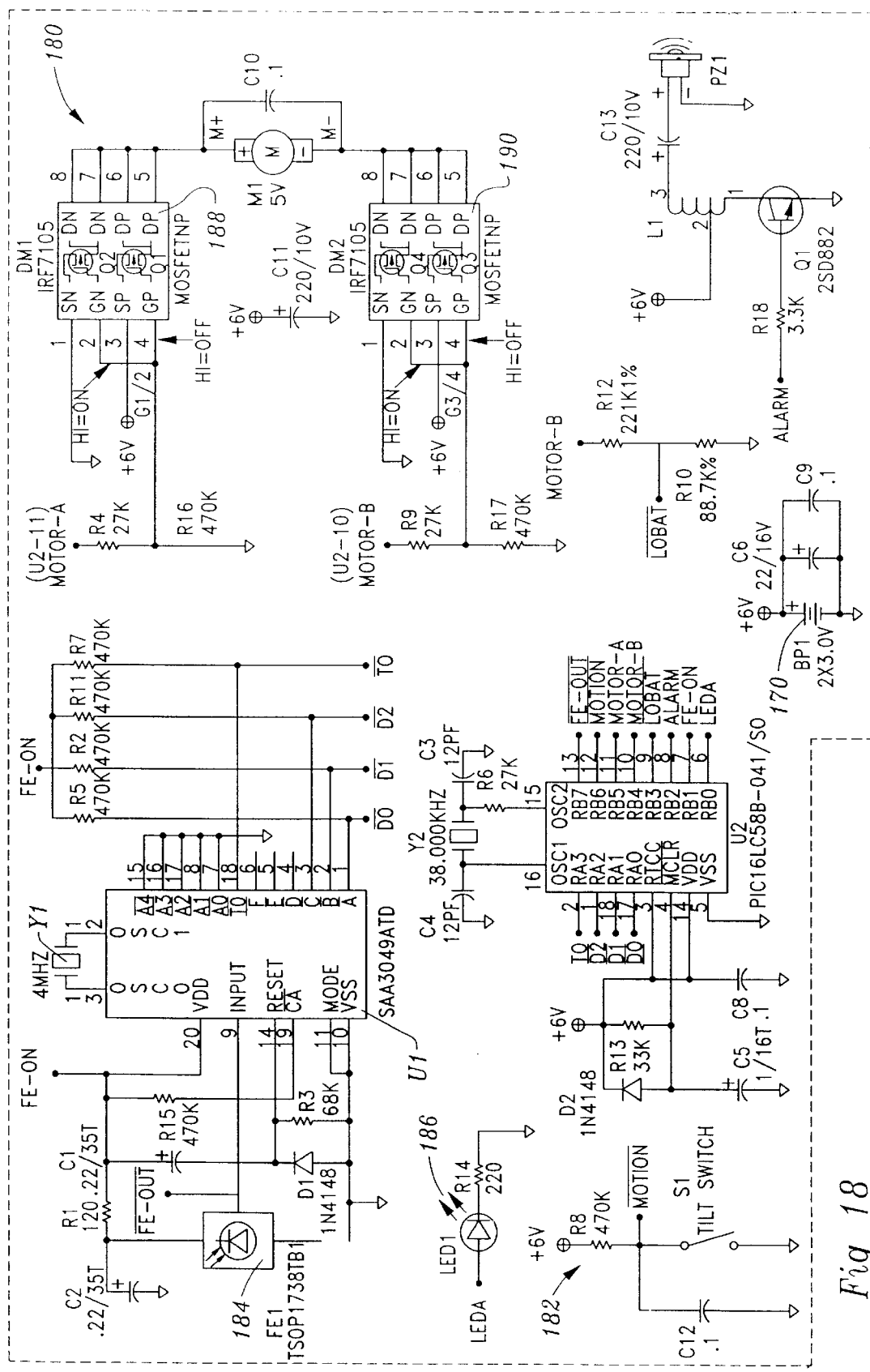
FIG. 18 is a schematic depiction of the processor/controller assembly according to the present invention.

FIG. 18 is a schematic depiction of the processor/controller assembly 180 according to the present invention and which is physically located within the housing 20 substantially on a circuit board received within slot 181 as delineated hereinabove. The processor/controller assembly 180 works in combination with transmitters 310, 320, 330 and 340.

Referring back to FIG. 1, infrared transmitters and/or transceivers, as are well known in the art, are employed for the transmitters or transceivers 310, 320, 330 and 340. Specifically, transmitters or transceivers 310, 320, 330 and 340 transmit discrete infrared signals at a variety of different frequencies wherein each frequency is correlative to a function of the device 10.

In one preferred form, the transmitter 310 is in the form of a pencil shaped transmitter comprised of a infrared transmitter that is hardware programmable for transmitting a signal having a frequency which is programmed by setting the pattern of a DIP switch or the like.

Transmitter 320 can be defined as a global transmitter 320 comprised of an infrared transmitter device that is software programmable by, for example, remote controller 340 (delineated below) for transmitting signals having different frequencies that are software programmable. For example, the transmitter device 320 can be programmed to output signals which include a deactivate signal, an activate signal, a lock up signal, and an unlock signal each signal having its own distinct frequency.

Transmitter 330 can be defined as a buried transmitter 330 preferably comprised of a infrared transmitter that is hardware programmable for transmitting a signal having a frequency which is programmed by setting that pattern of a DIP switch or the like.

Transmitter 340 is preferably in the form of a remote controller 340 as is well known in the art and which in itself can take the form of a universal remote, a multifunction remote, and a dedicated function remote. The universal remote preferably includes buttons correlative to the following functions: an activate function, a deactivate function, a lock up function, an unlock function, a secure function, and an option function as discussed below. The multifunction remote preferably includes all of the functions of the universal remote except the code function. The dedicated function remote preferably includes a matrix of buttons all having the unlock function for use in retrieving transport devices in the form of, for example, shopping carts such that a person merely has to press any where on the matrix to active the unlock function to release locked carts for ease in collection.

Thus, it can be seen that infrared transmitters and/or transceivers 310, 320, 330, 340 can be employed to control device 10 on cart 200 and simple activation can be initiated when cart 200 passes through a check out counter or leaves the confines of the store edifice by the use of the fixed buttonless transmitter 310, global transmitter 320, buried transmitter 330, and/or remote controller 340. Transmitters and/or transceivers 310, 320, 330 can employ a transmitter such as that manufactured by PHILIPS, England and sold under part number I RED SAA 3007 340 Chip. Transmitter and/or transceivers 340 can employ a transmitter and keypad such as that manufactured by PHILIPS, England and sold under part number I RED SAA 3007 340 Chip with eight carbon buttons (buttons of the remote 340).

Referring back to FIG. 18, the infrared transmitted signals by any one or combination of the transmitters and/or transceivers 310, 320, 330, 340 are received an infrared receiver 184 (FIG. 3) mounted on the circuit board and located adjacent window 39 juxtaposed in cutaways 38 formed in the top cover 22 and bottom cover 40 as shown in FIG. 3.

Thus, the infrared receiver 184 receives the discreet infrared signals from the transmitters and/or transceivers 310, 320, 330, 340 and feeds them to a decoder U1 such as that manufactured by PHILIPS, England and sold under part number SAA3049ATD. Resonator Y1 tunes decoder U1. The decoder U1 decodes the received IR signals passes the decoded signal, via lines D0, D1, and D2, to the programmable microcomputer U2 manufactured by MICROCHIP TECH of Chandler, Arizona and sold under part number PIC16LC58B-041/SO. The TO command of decoder U1 alerts or-flags microcomputer U2 to the subsequent 3-bit binary signals emanating through lines or ports D0, D1, and D2 of U1 and transmitted to lines ports D0, D1, and D2 of U2. Such signals correspond to the multiple modes of operation, mentioned above and further described hereinafter.

From FIG. 18, it can be observed that the programmable microcomputer or microprocessor U2 is capable of processing the various inputs depicted on FIG. 18. Specifically, motion sensor 182 (S1) produces signals that are depicted as entering microcomputer U2 at pin RB6 and in one preferred form, sensor 182 takes the form of a motion sensor that senses the actual motion of the transport device 200. Particularly, the sensor 182 has three states: a switch opened state (cart not moving), a switch closed state (cart tilted on side) and a switch moving state wherein the switch is moving between the opened and closed states (cart in motion). The Comus Group of Companies (e.g. Assemtech Europe limited) sells one example of this type of motion sensor under part number CW 1300-00.

Thus, the signal inputs from motion sensor 182 to microcomputer U2 permits microcomputer U2 to compare the motion of the transport device or cart 200, in the form of switch openings and closings, with a user defined value or event such as a pre-programmed maximum allowable TIME command. Thus, when the device 10 is activated by receiving an activation signal by one of the transmitters, decoding the signal and passing the signal to the microcomputer U2 for addressing a previously stored or programmed distance which is multiplied by an empirically determined average walking speed (2 to 3.5 miles per hour) to determine how long the transport device or cart can remain in motion (i.e. maximum allowable TIME command) before the device is placed in a lock up state. Note that when the transport device or cart stops the motion sensor stops sending signals to the microcomputer U2 and thus, the counting or timing of motion ceases. Specifically, the microcomputer U2 needs to receive a number of opening and closing sequences per second for motion to be counted for that second. Thus, a software counter programmed into U2 is used and incremented based only on sensed motion. In one preferred form, three opening and closing sequences per second are used as the criteria of motion being sensed by the sensor 182.

Of course, the time calculated by the motion sensor or in which the motion senor is active is correlative to a distance traveled by the cart 200 and thus, one can use this to limit the movement of cart 200 to a particular defined field of travel, for example, in a circular path such that the cart 200 will not travel further in a forward directional path after the sensor has had a cumulative period of activity which is equal to the preprogrammed user defined distance and correlative time period as calculated above.

Once the counter of the microcomputer U2 is incremented to a predefined value, such as zero, the microcomputer U2 sends a signal to turn on one or the other MOSFET 188, 190 for driving the motor from the first position (uninhibited state) to the second position defining a forward direction of the motor. Alternatively, when an unlock signal is sensed, decoded and received by the microcomputer U2 the motor is driven from the second position to the first position defining the reverse direction. Thus, the motor is driven with a positive voltage (e.g., +6 volts) in the forward direction and with a negative voltage (e.g., −6 volts) in the reverse direction. The motor is driven for a predefined period, for example 1.5 seconds and thus, only draws current during that time by way of the unique design of locking pin assembly 110.

Battery pack 170 (BP1) is employed to run motor 160 (M1) such that MOTOR-A and MOTOR-B outputs of microcomputer U2 represent movement of motor shaft 162 forward and backward according to direction arrow R of FIG. 7. Thus, microcomputer U2 serves as a trigger means for starting motor 160 when a high MOTOR-A signal and low MOTOR-B signal are received from microcomputer U2. Transistors Q1 and Q2 switch six-Volt DC power supply to motor 160. Similarly, transistors Q3 and Q4 switch power to initiate the movement of motor 160 in the opposite direction when a high MOTOR-B signal and low MOTOR-A signal are received from microcomputer U2. When low MOTOR A and MOTOR B signals are sent to microcomputer U2, motor 160 does not operate for lack of continuity.

At the point of lockup, an LED 186 flashes rapidly. FIG. 18 shows the connection of LED 186 through resistor R14 to microcomputer U2. It should be noted the resonator Y2 is used to tune-microcomputer U2 between resonating capacitors C4, C3, as well as imbalance resistor R6.

Microcomputer U2 includes a LOBAT function that test the battery 170 as shown in FIG. 18 as being a six Volt DC battery pack in parallel with capacitors C6 and C9.

FIG. 18 also illustrates an alarm means that can receive a signal from microcomputer U2 and it should be apparent that the alarm means can be in the piezo buzzer or alarm 198, a radio transmitter, and the like.

Figure 19:
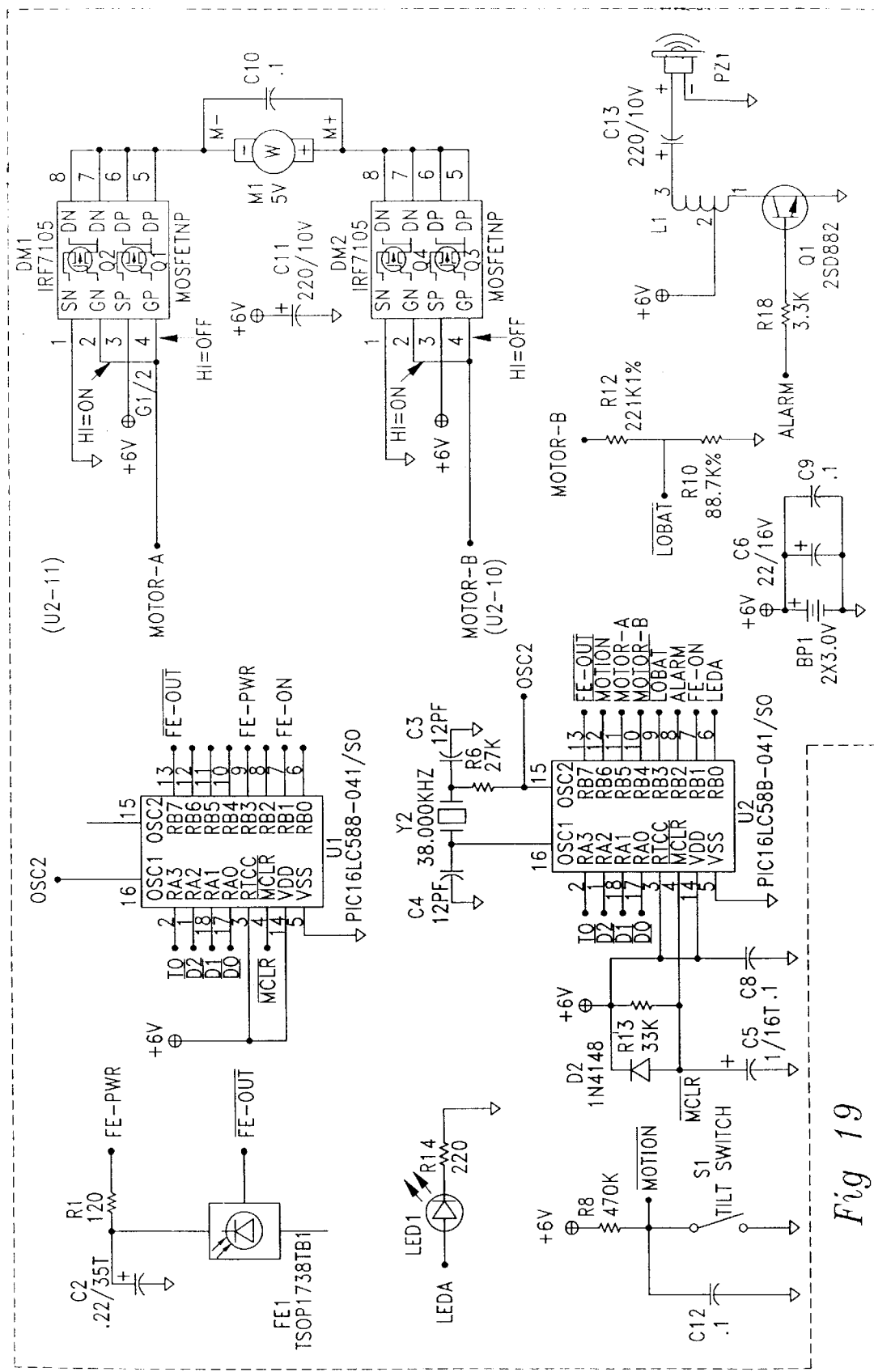
FIG. 19 is a schematic depiction of another embodiment of the processor/controller assembly according to the present invention.

FIG. 19 is a schematic depiction of another embodiment of the control system according to the present invention wherein the decoder U1 and its functionality is replaced by programmable microcomputer microcomputer U2 manufactured by MICROCHIP TECH of Chandler, Ariz. and sold under part number PIC16LC58B-041/SO.

Figure 20:
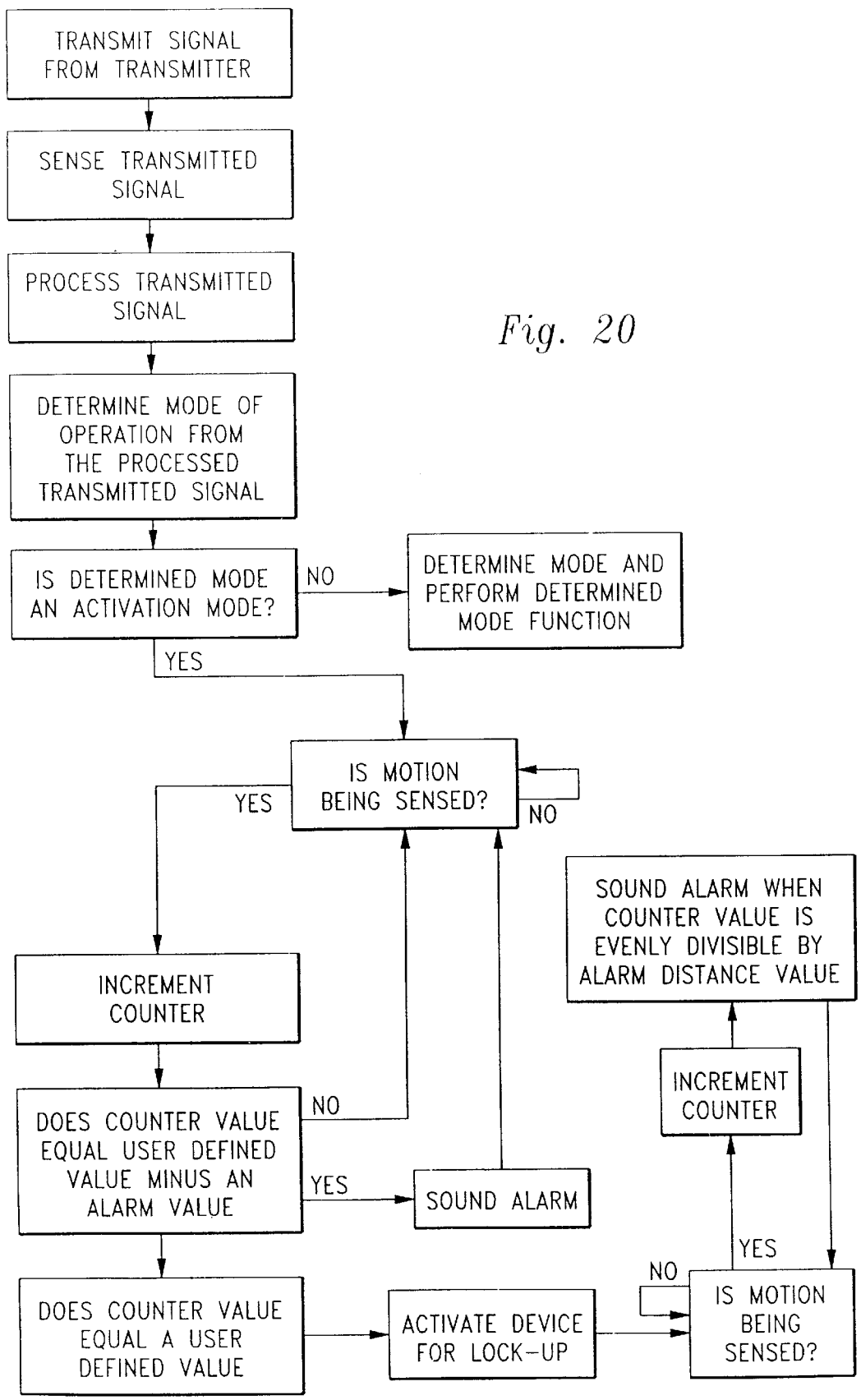
FIG. 20 is a general flow chart of operation including locking assembly activation.

In use and operation and referring to FIG. 1 and FIG. 20, signals are transmitted from one or more transmitters and/or transceivers 310, 320, 330, and 340 and the signals are sensed by infrared receiver 184 which in turn, feeds the decoder U1 such that the signals are decoded and output to the programmable microcomputer U2 which determines the mode of operation from the decoded or processed signals. If the activation mode is determined the programmable microcomputer U2 senses the state of the motion sensor 182 and increments the counter accordingly until, based on a comparison, the counter value is equal to a user defined value minus an alarm value wherein alarm 198 is sounded. The microcomputer U2 continues to sense the state of the motion sensor 182 and increments the counter accordingly until, based on a comparison, the counter value is equal to a user defined value wherein the device 10 is activated into the lockup state and lock up pin 124 is either biased against the cup 60 as shown in FIGS. 10 and 13 or is injected into one of the notches 65, 66, 67, or 68 as exemplified in FIGS. 11 and 14. It should be noted that, for example, each count of the counter can be representative of one second of time that the transport device is traveling which is a correlative to the distance traveled by the transport device or shopping cart 200.

Once the device 10 has been activated the microcomputer U2 continues to sense the state of the motion sensor 182 and increments the counter accordingly. After each of these increments, it is determined if the counter value is evenly divisible by the alarm distance value and if it is, the alarm 198 is sounded.

Figure 21A:
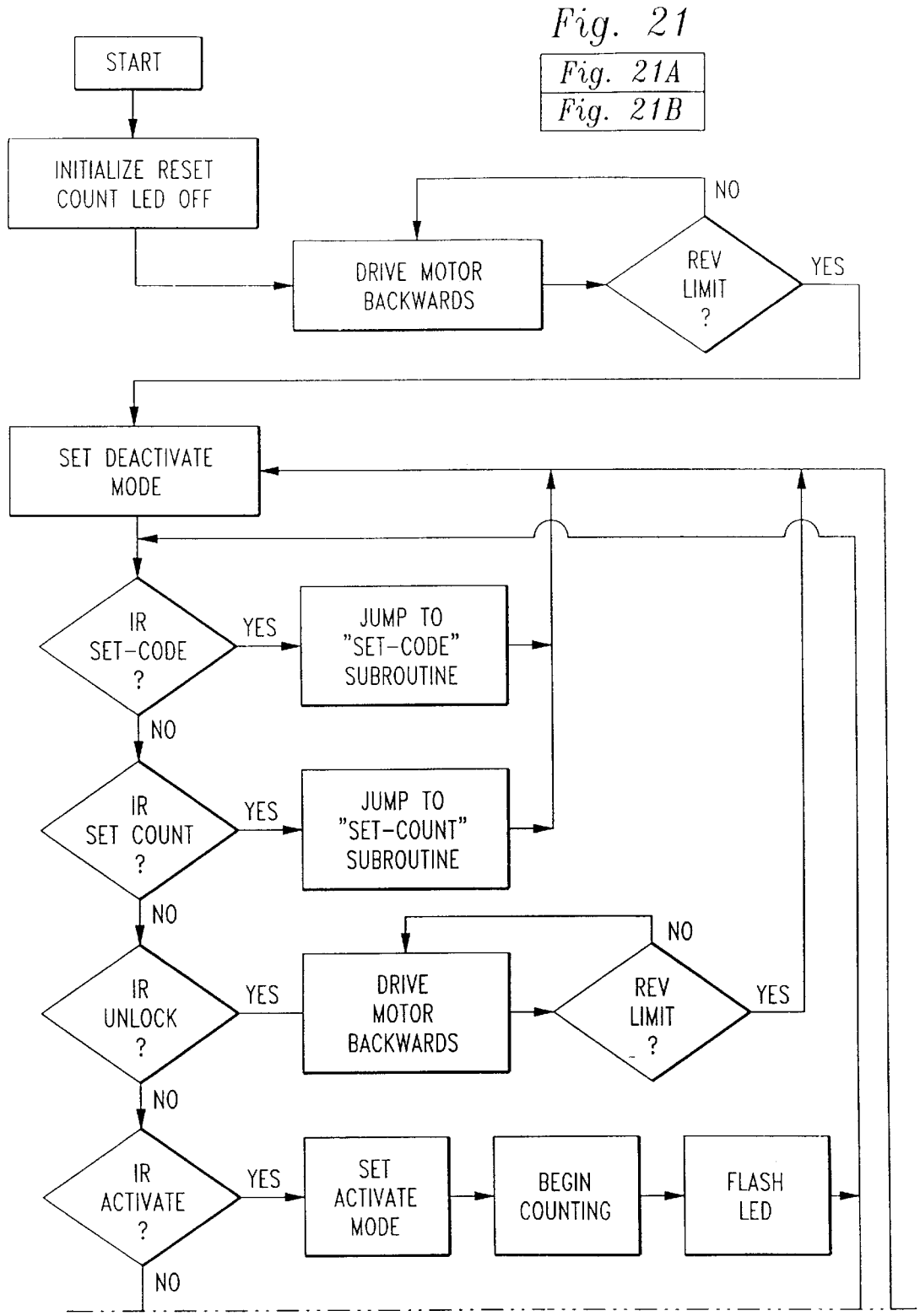
FIGS. 21A and 21B are a flow chart of functions programmed into the control system of the present invention.
Figure 21B:
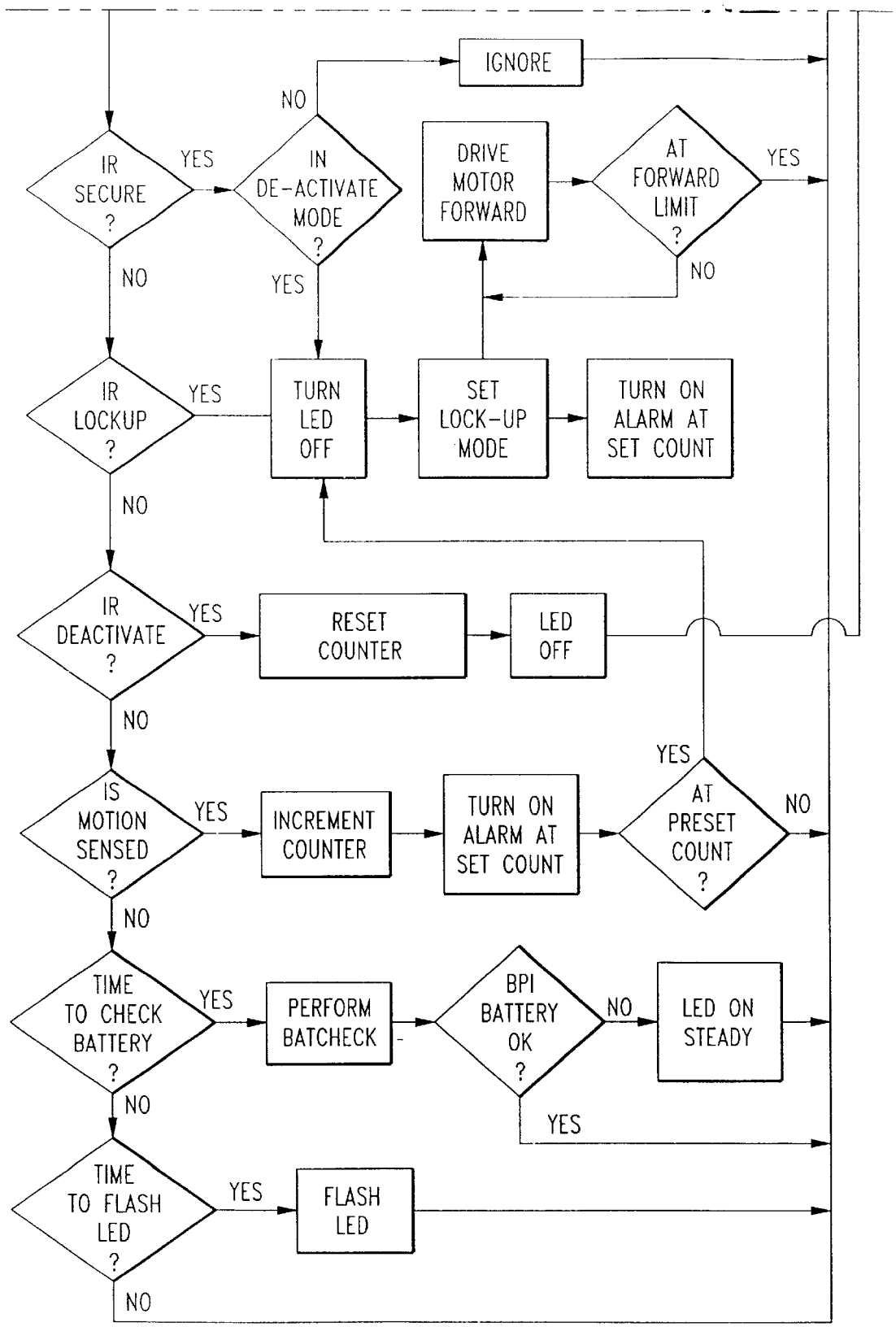

FIGS. 21A and 21B comprise a flow chart detailing the functions programmed into the security device 10 of the present invention.

With reference to FIGS. 21A and 21B, the security device 10 is capable of at least ten functions, which will be discussed separately as follows:

1. SET DEACTIVATE MODE
2. SETCODE
3. SET COUNT (distance programmable by code button)
4. UNLOCK
5. ACTIVATE
6. SECURE (only activates deactivated cart at exits)
7. LOCKUP
8. DEACTIVATE
9. BATTERY CHECK
10. FLASH LED FIGS. 21A shows that at start up the counter is reset and the LED is off. The motor is then driven backward for a reverse limit or preset period of time. Next, the deactivate mode is set.

1. SET DEACTIVATE MODE: a separate discreet infrared command initiates the DEACTIVATE sequence through infrared receiver 184. The DEACTIVATE signal from decoder U1 overrides the ACTIVATE command and immiediately stops the counting sequence. At this time, the total count is restored or reset to zero (0) turning off LED 186.

2. SET CODE: this command can only be transmitted by a discreet signal originating with a master transmitter appropriately programmed and used in conjunction with receiver 184. The SET CODE programs the microcomputer. SET CODE can also include a SET SECURITY CODE command that only be transmitted by a discreet signal originating with a master transmitter similar appropriately programmed and used in conjunction with receiver 184. The SET SECURITY CODE programs the microcomputer for the four (4) button sequence needed to access the SET COUNT sequence. This feature provides protection against unauthorized changes to the preset distances cart 200 is allowed to travel before LOCKUP is activated.

3. SET COUNT (distance programmable by code button): the SET COUNT or SET TIME sequence is initiated by a separate and discreet infrared command originating with transmitter 340. The SET COUNT or SET TIME sequence selects a number of closures of switch S1 in incremental values. In other words, a particular button or buttons of transmitter 340 would be continually pushed to increase the permissible travel of the transport device. For example, each time one particular button in the SET COUNT sequence is pushed, eighty (80) yards could be added to the permissible travel of the transport device and when another particular button in the SET COUNT sequence is pushed, sixteen (16) yards could be added to the permissible travel of the transport device. Of course, other distance increments may be used in this aspect of the present invention. Entering the SET COUNT sequence sets the permissible number to zero (0). The incremental number of closures or group of closures to be preset can then be entered. The LED 186 flashes rapidly when the SET COUNT or SET TIME is returned to zero (0). Thus, the user receives the signal indicating the distance of travel starting point.

4. UNLOCK: The UNLOCK command is initiated by a discreet infrared signal transmitted to receiver 184 and sent to microcomputer U2 from decoder U1. The UNLOCK command is incompatible with the DEACTIVATE, SET COUNT, OR SET CODE modes. Thus, when any of these commands are in effect the command has no effect. Once the UNLOCK command is received, microcomputer U2 triggers battery pack to apply power to motor 160 or M1, in the reverse direction. In this position, the locking pin is retracted. Once the backward limit of the travel or the time the motor is energized is detected microcomputer U2 that disconnects power from motor 160, M1. Again, spring 136 is able to absorb travel of the linkage assembly to stores this energy within the spring. The device 10 is restored to the DEACTIVATE mode at this time.

5. ACTIVATE: To activate device 10, infrared receiver receives a discreet infrared signal from one or more infrared transmitters through window 39. The infrared receiver through decoder U1 will generate a command signal to microcomputer U2 to set the count total to zero (0). At this point, microcomputer U2 will commence sensing motion from the motion sensor. The LED 186 is also initiated at this time; flashing brightly approximately every two (2) seconds for a short duration until LOCKUP is reached or another overriding command is received from decoder U1. Output signals from the motion sensor 182 are sent to microcomputer U2 where they are processed and then compared to a pre-programmed maximum allowable number, the SET COUNT number.

6. SECURE (only activates deactivated cart at exits): the SECURE sequence is initiated by a discreet infrared command to receiver 184. Decoder U1 sends this signal to microcomputer U2 which checks to verify if the system is in the ACTIVATE mode. If it is not, the system enters the LOCKUP mode as described above. If the system is in the ACTIVATE mode, the SECURE command is ignored. Thus, the SECURE command will only supersede the DEACTIVATE command. Once in the SECURE mode, the device 10 will only accept the UNLOCK command.

7. LOCKUP: the LOCKUP command overrides either ACTIVATE or DEACTIVATE. LOCKUP initiates by the discreet infrared command to infrared receiver 184 or by the total count reaching the maximum SET COUNT number set. Thus, the LOCKUP sequence may be initiated, by the decoder U2 signaling microcomputer U2 when transmitters sends IR signals to receiver 184. In either case, the U2 output trigger means drives the motor 160, M1 in a forward direction. At this point, the locking assembly 110 has moved from a first position shown in FIG. 9 to a second activated position shown in FIG. 10 wherein the locking pin 124 is biased against the cup 60 or has been injected into one of the notches. Thus, in the abutting state, the device 10 has gone from the initial quiescent state to a potential energy storage state wherein when the locking pin 124 comes into abutment under the drive of the linkage assembly 140 and then the motor, under the control of the processor/controller 180, continues to drive the linkage assembly 140 for a certain period of time such that the spring or energy storage means 136 is compressed between the locking pin follower 112 operatively coupled to the linkage assemble 140 and the locking pin 124 thereby retaining the spring or energy storage means in an activated state for retaining a biased abutment of locking pin 124 with cup 60. A certain acute angle (shown as $\phi_1$ and $\phi_2$ in FIG. 9) swivel or pivot of the caster 80 along double ended arrow P and about pivot axis A will result in the spring or energy storage means 136 being released from an active state wherein the energy from the spring or energy storage means 136 injects the locking pin 124 into one of the two notches 65, 66 with the locking pin follower 1112 being held by linkage assembly 140 such that the device goes into a lock up condition and the locking pin assembly 110 goes into a final quiescent state thereby resulting in the cart 200 being placed in an inhibited state and traveling in a circular direction with the wheel substantially positioned in the direction of either vector $T_1$ or $T_2$ depending on swivel direction. Thus, microcomputer U2 serves as trigger means for starting motor 160, M1, either in a forward or backward direction. In addition, the LOCKUP signal may be translated into audio alarm. The security device 10 will remain in this condition until the UNLOCK command is received by microcomputer U2.

8. DEACTIVATE: a deactivate signal is a separate discreet infrared command that initiates the DEACTIVATE sequence through infrared receiver 184. The DEACTIVATE signal from decoder U1 overrides the ACTIVATE command and immediately stops the counting sequence. At this time, the total count is restored or reset to zero (0) turning off LED 186.

9. BATTERY CHECK: Checks the battery and it should also be noted that, LED 186 would continuously light when battery pack reaches a pre-programmed low voltage value.

10. FLASH LED: command to determine if is time to flash LED 186

Figure 22A:
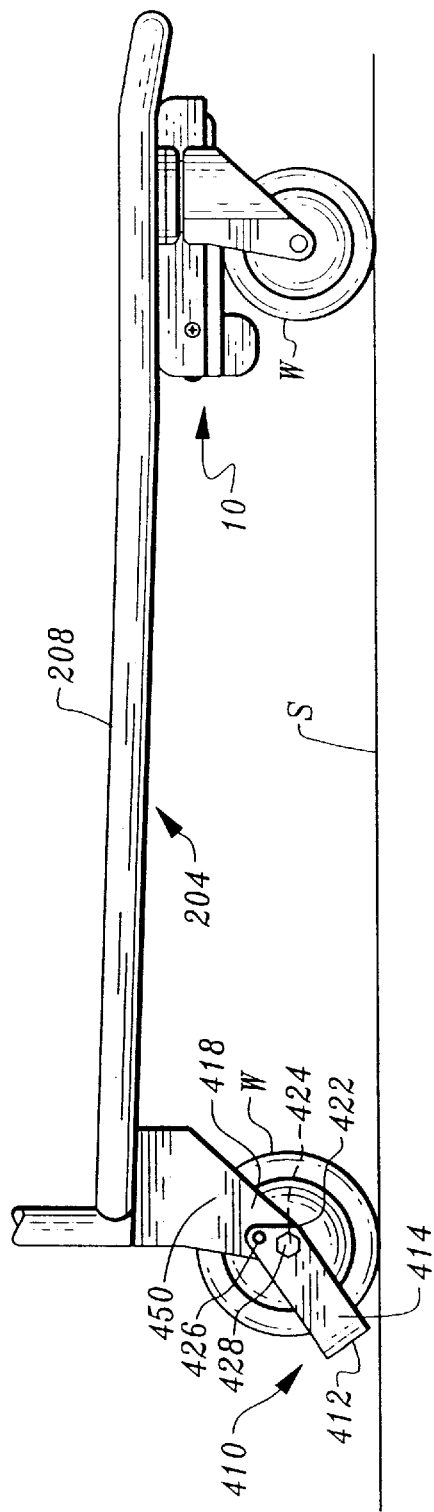
FIG. 22A is a side perspective view of the anti-tilt bracket mounted on a back caster assembly according to the present invention.

FIG. 22A depicts a side perspective view of the anti-tilt bracket 410 being mounted on a back stationary caster or wheel assembly 450 of the cart 200 according to the present invention.

Figure 22B:
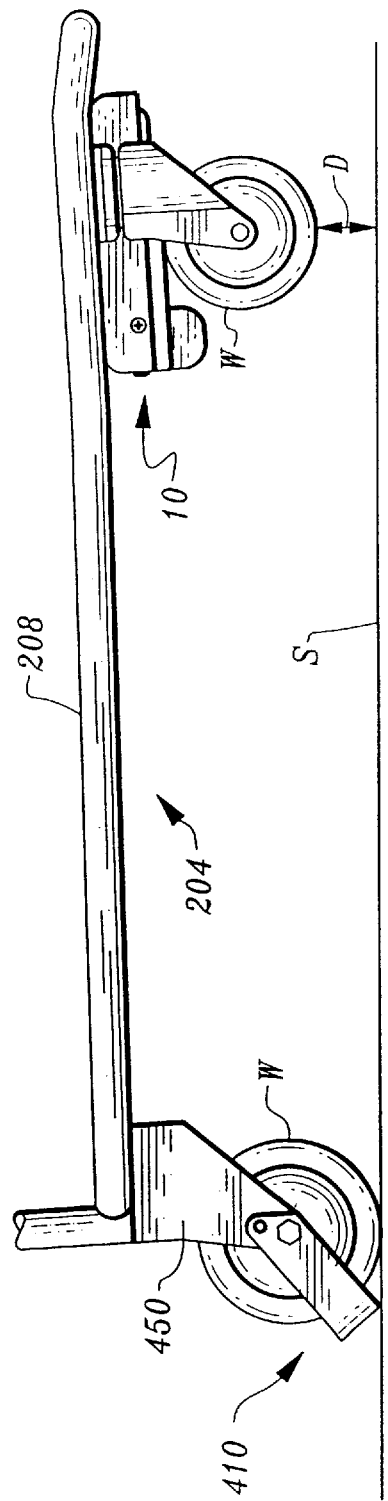
FIG. 22B is a side perspective view of the anti-tilt bracket mounted on a back caster assembly according to the present invention and shown abutting the ground as a result of the front of the cart being tilted up.

FIGS. 22B depicts a side perspective view of the anti-tilt bracket mounted on the back stationary caster or assembly 450 of the cart 200 and shown abutting the ground as a result of the front of the cart 200 being tipped up.

Referring to back to FIG. 1, the present invention further includes the anti-tip device or bracket 410 rigidly coupled to the back of the cart 200 for precluding tipping of the cart 200 in order to redistribute the weight of the cart 200 onto the rear rotatable wheels W of the cart 200 in an attempt to circumvent the device 10.

Particularly, and referring to FIGS. 1 and 22A, the anti-tip device or bracket 410 is preferably U-shaped and comprised of a bottom portion 412 and two spaced apart flanges 414 (FIG. 22A), 416 (FIG. 1) extending substantially parallel from bottom portion 412. Each flange terminates into an angled end 418 having, radiused corners 422 and one not shown on the opposite side of wheel W. The end 418 of each flange 414, 416 also includes an axle hole 424 and a weld hole 426 wherein the two flanges cradle the wheel W. An axle 428 passes through the wheel and axle hole 424 at each flange end. Axle 86 can be mounted to the two flanges 414, 416 via a button head bolt that is secured on the opposite side thereof via a security nut. Alternatively, a rivet may be used in place of head bolt and security nut. Weld hole 426 and the adjacent area of each flange are welded to the respective area of the back stationary caster assembly 450. Hence, anti-tip device or bracket 410 is rigidly fixed to a rear caster assembly 450 and rearwardly and downwardly extends from the back of the cart 200 such that it abuts the surface on which it is supported when the card is tilted back or tipped up such that the anti-tip device 410 limits the distance D that the front wheels leave the support surface S thereby for precluding tipping of the cart 200 in order to redistribute the weight of the cart 200 onto the rear rotatable wheels W of the cart 200 in order to redistribute the weight of the cart 200 onto the rear rotatable wheels W of the cart 200 in an attempt to circumvent the device 10. The anti-tip device 410 is preferably disposed on a rear wheel W diametrically opposed or opposite from device 10 as shown in FIG. 1. Thus, if device 10 is on the front left wheel, device 410 is coupled to the back right wheel.

Moreover, having thus described the invention, it should be apparent that numerous structural modifications and adaptations may be resorted to without departing from the scope and fair meaning of the present invention as set forth hereinabove and as described hereinbelow by the claims.

I claim:

1. A security device for a transport device, possessing a frame and a swivel caster having a wheel, the swivel caster pivoting about a vertical axis, comprising:

a. a housing, said housing including a top cover having a bulbous wall and a bottom cover having a crescent shaped cutaway wherein said bulbous wall and said crescent shaped cutaway define a circumscribing well characterized by an open space vertically extending through the bottom housing cover;

b. said housing operatively coupled between the frame of the transport device and the swivel caster having a wheel;

c. an extension having at least one opening, said extension being at least partially received within said housing and rigidly coupled to the swivel caster; and d. means positioned within said housing for coacting with said at least one opening of said extension and for precluding motion of the swivel caster about the vertical pivot axis for substantially inhibiting the direction of travel of the transport device to a restricted circular path while allowing free rotation of the wheel.

2. The security device of claim 1 in which said extension is in the form of a cup having a bottom wall rigidly coupled to and surmounting said swivel caster and a cylindrical sidewall transitioning and upwardly extending from said bottom wall, said cylindrical sidewall including a plurality of openings for receiving said coacting means.

3. The security device of claim 2 in which said coacting means includes a locking pin slideably coupled within in said housing for extending into and out of one of said plurality of openings when actuated and aligned therewith.

4. The security device of claim 3 in which said coacting means further includes a locking pin follower received within a blind bore of said locking pin and slideably retained therein.

5. The security device of claim 4 in which said coacting means further includes a spring captured between said locking pin and said locking pin follower.

6. The security device of claim 5 in which said coacting means further includes a linkage assembly operatively coupled between a motor and said locking pin follower for moving the linkage assembly from a first position to a second position where the locking pin is injected into one of said plurality of openings when aligned therewith.

7. The security device of claim 6 in which said spring is compressed between the locking pin follower and the locking pin when said linkage assembly is in said second position and said locking pin is out of alignment with said plurality of openings for retaining a biased abutment of said locking pin with said cup without drawing current from said motor and allowing the locking pin to be injected into one of said plurality of openings when aligned therewith by a release of a potential energy of said compressed spring.

8. The security device of claim 1 wherein said wheel of said swivel caster defines one of two front wheels of the transport device, said transport device further including a pair of rear wheels.

9. The security device of claim 1 in which said transport device further includes at least one rear wheel and which further comprises an anti-tip member rigidly coupled to a back of the transport device in order to redistribute the weight of the transport device onto the rear wheel.

10. A security device for a transport device having a frame with front and rear wheels mounted thereon, the security device comprising, in combination:
   a. a housing having a well, said housing operatively coupled between the frame of the transport device and a swivel caster operatively coupled to the frame and having one of the wheels;
   b. a circumscribing member rigidly coupled to and surmounting said swivel caster, said circumscribing member being at least partially nested within said well of said housing, said circumscribing member including diametrically opposed sets of notches wherein a first set of notches lies adjacent a locking pin in a forward direction of travel and a second set of notches lies adjacent the locking pin in a reverse direction of travel; and
   c. means positioned within said housing for coacting with said circumscribing member for precluding motion of said swivel caster about a vertical pivot axis, said coacting means including the locking pin slideably coupled within said housing,
   wherein the locking pin is operatively coupled to control means for activating said locking pin into and out of a lockup state such that said locking pin projects into one of said first set of notches in the forward direction of travel and into one of said second set of notches in the reverse direction of travel when in alignment therewith.

11. The security device of claim 10 wherein one of said first set of notches is in alignment with said locking pin when said swivel caster rotates along an arcuate path having an acute angle relative to the forward direction of travel of said locking pin.

12. The security device of claim 10 wherein one of said second set of notches is in alignment with said locking pin when said swivel caster rotates along an arcuate path having an acute angle relative to the reverse direction of travel at said locking pin.

13. The security device of claim 12 wherein said acute angle is less than twenty-five degrees.

14. The security device of claim 10 further including an anti-tip member rigidly coupled to a back of the transport device for precluding tipping of the transport device in order to redistribute the weight of the transport device onto the rear wheels in an attempt to circumvent said security device.

* * * * *